United States Patent
Hegarty et al.

(10) Patent No.: US 11,288,045 B1
(45) Date of Patent: Mar. 29, 2022

(54) OBJECT CREATION FROM STRUCTURED DATA USING INDIRECT CONSTRUCTOR INVOCATION

(71) Applicant: Oracle International Corporation, Redwood Shores, CA (US)

(72) Inventors: Chris Hegarty, Dublin (IE); Alexander R. Buckley, Cupertino, CA (US); Julia Katharina Boes, Dublin (IE)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/171,327

(22) Filed: Feb. 9, 2021

(51) Int. Cl.
G06F 9/45 (2006.01)
G06F 8/41 (2018.01)
G06F 12/02 (2006.01)
G06F 8/30 (2018.01)

(52) U.S. Cl.
CPC .............. G06F 8/443 (2013.01); G06F 8/315 (2013.01); G06F 12/023 (2013.01)

(58) Field of Classification Search
CPC ......... G06F 8/443; G06F 8/315; G06F 12/023
USPC ........................................................ 717/151
See application file for complete search history.

(56) References Cited

U.S. PATENT DOCUMENTS

| | | | |
|---|---|---|---|
| 4,829,471 A | 5/1989 | Banerjee et al. | |
| 5,161,223 A | 11/1992 | Abraham | |
| 5,684,984 A | 11/1997 | Jones et al. | |
| 6,173,327 B1 | 1/2001 | De et al. | |
| 6,477,701 B1 | 11/2002 | Heistermann et al. | |
| 6,633,888 B1 * | 10/2003 | Kobayashi | G06F 8/34 |
| 10,048,959 B2 | 8/2018 | Sun | |
| 10,713,197 B2 | 7/2020 | Park et al. | |
| 2005/0114871 A1 | 5/2005 | Wolff et al. | |
| 2006/0047685 A1 | 3/2006 | Dearing et al. | |
| 2007/0168949 A1 * | 7/2007 | Shattuck | G06F 9/4492 717/115 |
| 2008/0163078 A1 * | 7/2008 | Van Der Sanden | G06F 9/451 715/762 |
| 2009/0037807 A1 | 2/2009 | Kuznetsov et al. | |
| 2011/0206381 A1 | 8/2011 | Ji et al. | |
| 2011/0218981 A1 | 9/2011 | Retnakumari et al. | |
| 2012/0054452 A1 | 3/2012 | Kumar et al. | |
| 2013/0305012 A1 | 11/2013 | Hopley | |
| 2015/0199080 A1 | 7/2015 | Pletter et al. | |

(Continued)

OTHER PUBLICATIONS

Title: Exploiting local similarity for indexing paths in graph-structured data, Author: R Kaushik, published on 2002.*

(Continued)

*Primary Examiner* — Chameli Das
(74) *Attorney, Agent, or Firm* — Invoke

(57) ABSTRACT

A data-instantiator method handle is configured to instantiate a target class based on a structured data object. One type of data-instantiator method handles is a Structured Data Object Processor method handle (SDOP_mh). The runtime environment invokes a SDOP_mh to create a target object based on a name-index map and an index-value map. The SDOP_mh is adapted, directly or indirectly, from a direct method handle that references a constructor of the target class. In an embodiment, the constructor referenced by the direct method handle is a canonical constructor. In an embodiment, the SDOP_mh is a runtime-computed constant in a runtime constant pool.

33 Claims, 13 Drawing Sheets

(56) References Cited

U.S. PATENT DOCUMENTS

| | | | |
|---|---|---|---|
| 2015/0268878 A1 | 9/2015 | Amit et al. |
| 2015/0286609 A1 | 10/2015 | Hahn et al. |
| 2018/0052708 A1 | 2/2018 | Ganesan et al. |
| 2018/0075107 A1 | 3/2018 | Park et al. |
| 2019/0215157 A1 | 7/2019 | Guo et al. |
| 2021/0064380 A1 | 3/2021 | Mai et al. |

OTHER PUBLICATIONS

Title: A technique for dynamic updating of Java software, author: A Orso,, published on 2002.*

All together now: A shortcut for @ToString , @EqualsAndHashCode, @Getter on all fields, @Setter on all non-final fields, and ©RequiredArgsConstructor, available online at < https://projectlombok.org/features/Data >, 5 pages, dataed: 2009.

Hegarty et al., "Record Serialization" in Inside Java, available online at < https://inside.java/2020/07/20/record-serialization/ >, Jul. 20, 2020, 6 pages.

JEP 309: Dynamic Class-File Constants, available online at < https://openjdk.java.net/jeps/309 >, 4 pages, dated 2017.

JEP 384: Records (Second Preview), available online at < https://openjdk.java.net/jeps/384 >, (2020), 8 pages.

Rose, "Bytecodes meet Combinators: invokedynamic on the JVM," avaolable online at < https://cr.openjdkjava.net/~jrose/pres/200910-VMIL.pdf >, 11 pages.

* cited by examiner

OBJECT CREATION FROM STRUCTURED DATA USING INDIRECT CONSTRUCTOR INVOCATION

CROSS-REFERENCE TO RELATED APPLICATIONS

This application is related to U.S. patent application Ser. No. 17/171,254, filed Feb. 9, 2021, U.S. patent application Ser. No. 16/834,139, filed Mar. 30, 2020, and U.S. patent application Ser. No. 16/834,239, filed Mar. 30, 2020; each of which is hereby incorporated by reference.

TECHNICAL FIELD

The present disclosure relates to creating an object in a heap memory based on structured data. In particular, the present disclosure relates to instantiating a target class from structured data using a direct method handle to a constructor of the target class.

BACKGROUND

Source code is written according to a specification directed to the convenience of the programmer. A compiler converts source code to machine or object code, which is executable directly by a particular machine environment. Alternatively, a compiler converts source code to an intermediate representation ("virtual machine code/instructions"), such as bytecode, which is executable by a virtual machine that is capable of running on top of a variety of machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section

BRIEF DESCRIPTION OF THE SEVERAL VIEWS OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one.

To easily identify the discussion of any particular element or act, the most significant digit or digits in a reference number refer to the figure number in which that element is first introduced.

DETAILED DESCRIPTION

Figure 1:
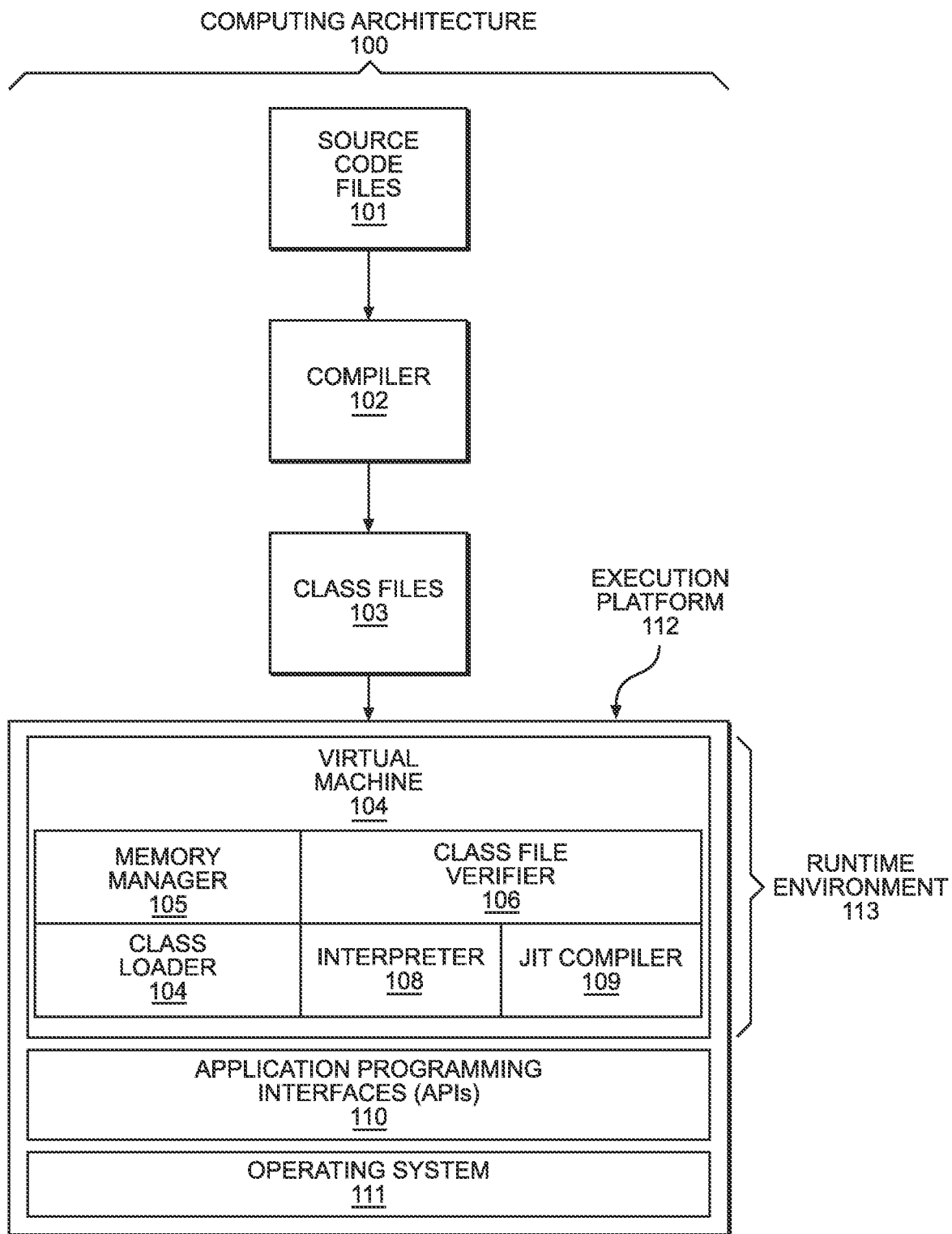
FIG. 1 illustrates an example architecture in which techniques described herein may be practiced according to an embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   a. EXAMPLE CLASS FILE STRUCTURE
   b. EXAMPLE VIRTUAL MACHINE ARCHITECTURE
   c. LOADING, LINKING, AND INITIALIZING
3. STRUCTURED DATA OBJECT PROCESSOR METHOD HANDLE (SDOP_MH)
4. INSTANTIATOR ARCHITECTURE
5. COMPILING A CLASS TO SUPPORT INSTANTIATION BASED ON STRUCTURED DATA
6. CREATING A TARGET OBJECT BASED ON A STRUCTURED DATA OBJECT
7. OBTAINING A CONSTANT SDOP_MH FROM A RUNTIME CONSTANT POOL
8. OBTAINING AN ARGUMENT DISCOVERY METHOD HANDLE (AD_MH)
9. HARDWARE OVERVIEW
10. MISCELLANEOUS; EXTENSIONS

1. GENERAL OVERVIEW

"Structured data" (also referred to as "parameterized data") is an organization of atomic values (such as integers or strings) into sets, sequences, and graphs, including recursive arrangements thereof, in accordance with a given data format. An example of structured data is a sequence of sequences, where each subsequence contains a string (denoting a stock ticker) followed by a sequence of integers (denoting the five most recent closing prices of the stock).

A part of the organization, when referenced in the context of the structured data, may be referred to as a "structured data field." For example, within each subsequence above, the stock ticker part may be referred to as the "ticker" field (with type "string") and the closing prices part may be referred to as the "prices" field (with type "sequence of integer").

Examples of data formats include JavaScript Object Notation (JSON), Extensible Markup Language (XML), and Comma Separated Values (CSV). As an example, structured data that is organized as the sequence of sequences above, using JSON for formatting, may produce:

{"data":
  [
    {"ticker": "T",
      "prices": [30, 29, 28, 30, 26]},
    {"ticker": "IBM",
      "prices": [131, 132, 135, 140, 131] }
  ]
}

As another example, structured data that is organized as the sequence of sequences above, using CSV for formatting, may produce:
ticker, prices
T, 30, 29, 28, 30, 26
IBM, 131, 132, 135, 140, 131

Another example of a data format is a map pair. A map is a sequence of key:value associations ("mappings"). A map pair is a first map where successive keys denote successive elements of some sequence or set, S, and a second map whose values denote sequences that are related to elements in S. A key in the first map may be associated with a value (the "index" value) in the first map that, in turn, may serve as a key in the second map that is associated with a value in the second map. The index value causes a key in the first map (the "name-index" map) to be indirectly associated with a value in the second map (the "index-value" map). As an example, structured data that is organized as the sequence of sequences above may be expressed with a name-index map:
"T"—0
"IBM"—1
and with an index-value map:
0—[30, 29, 28, 30, 26]
1—[131, 132, 135, 140, 131]

Structured data in a given format that is convertible into an object within a heap memory may be referred to as a "structured data object." Converting a structured data object into an object within a heap memory (referred to as the "target object") involves instantiating a particular class (referred to as the "target class") based on the structured data fields of the structured data object.

One or more embodiments include instantiating a target class based on a structured data object using a set of method handles, related in a method handle graph, including a direct method handle to a constructor of the target class. A method handle is a strongly-typed reference to an underlying method or constructor, whereby invoking the method handle causes invocation of the underlying method or constructor. A method handle graph illustrates relationships between a direct method handle (represented by a root node) to a constructor of a target class, zero or more intermediate method handles (represented by intermediate nodes), and an outermost method handle (represented by a leaf node). The outermost method handle is referred to herein as a "Structured Data Object Processor method handle" or "SDOP_mh." The set of method handles, as represented by the method handle graph, matches data values for structured data fields to appropriate parameters of the constructor, and finally invokes the constructor to create an instance of the target class. The SDOP_mh is therefore adapted, directly or indirectly, from the direct method handle to the constructor of the target class. In an embodiment, the constructor referenced by the direct method handle is a canonical constructor. The parameters of the canonical constructor are same as the fields of the target class, in the same sequence in which the fields are declared in the target class.

One or more embodiments include instantiating a target class based on a specific type of structured data objects—a map pair. A method handle graph for instantiating the target class includes a respective Argument Discovery method handle for each field of the target class. An Argument Discovery method handle for a particular field is configured to look up an index corresponding to a field name of the particular field based on a name-index map, and then look up the field value corresponding to the index based on an index-value map. The field value is hence "discovered" by the Argument Discovery method handle for insertion into the appropriate parameter position of the constructor referenced by the direct method handle in the method handle graph.

One or more embodiments include generating an SDOP_mh as a constant method handle referenced from a runtime constant pool. The SDOP_mh is a runtime-computed constant in the runtime constant pool. On first access of the runtime-computed constant, a bootstrap method is executed to compute the SDOP_mh. The SDOP_mh is then stored in a heap memory and available for subsequent access through the runtime constant pool. A constant method handle always causes invocation of the same underlying method or constructor, and thus may be optimized by the execution environment.

2. ARCHITECTURAL OVERVIEW

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
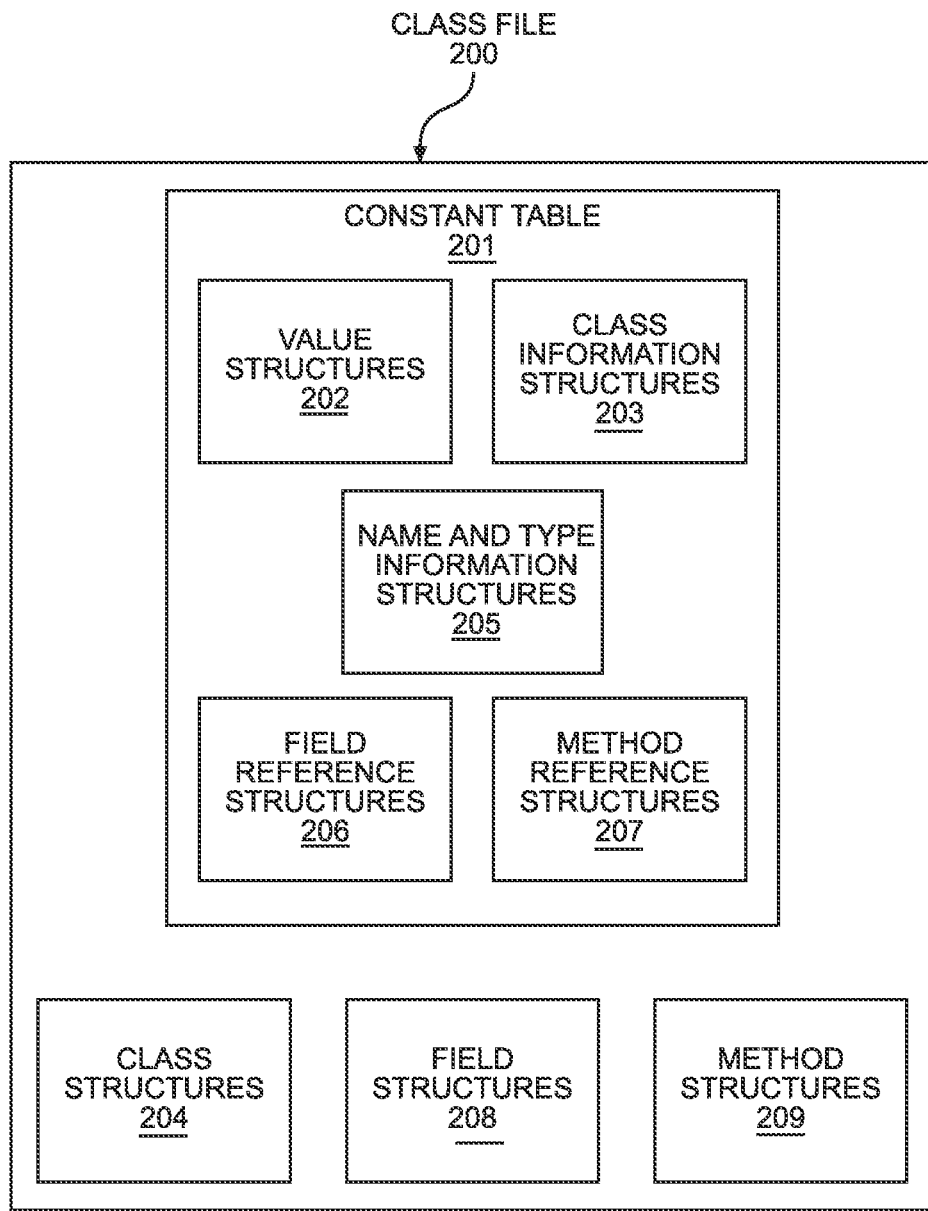
FIG. 2 is a block diagram illustrating one embodiment of a computer system suitable for implementing methods and features described herein according to an embodiment.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 (also referred to as "class metadata") includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
        int add12and13( ) {
                return B.addTwo(12, 13);
        }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
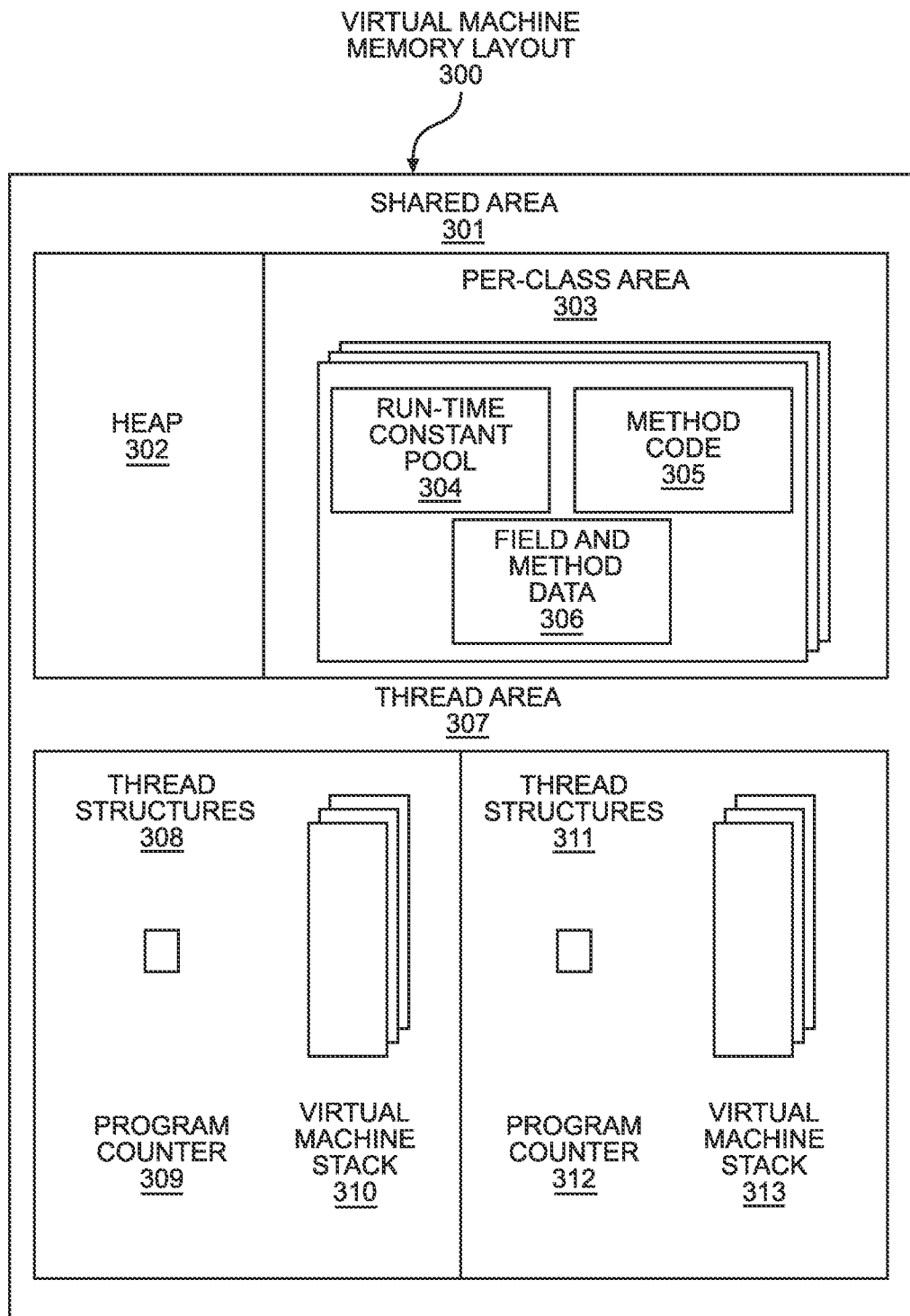
FIG. 3 is a block diagram illustrating an example virtual memory machine layout according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
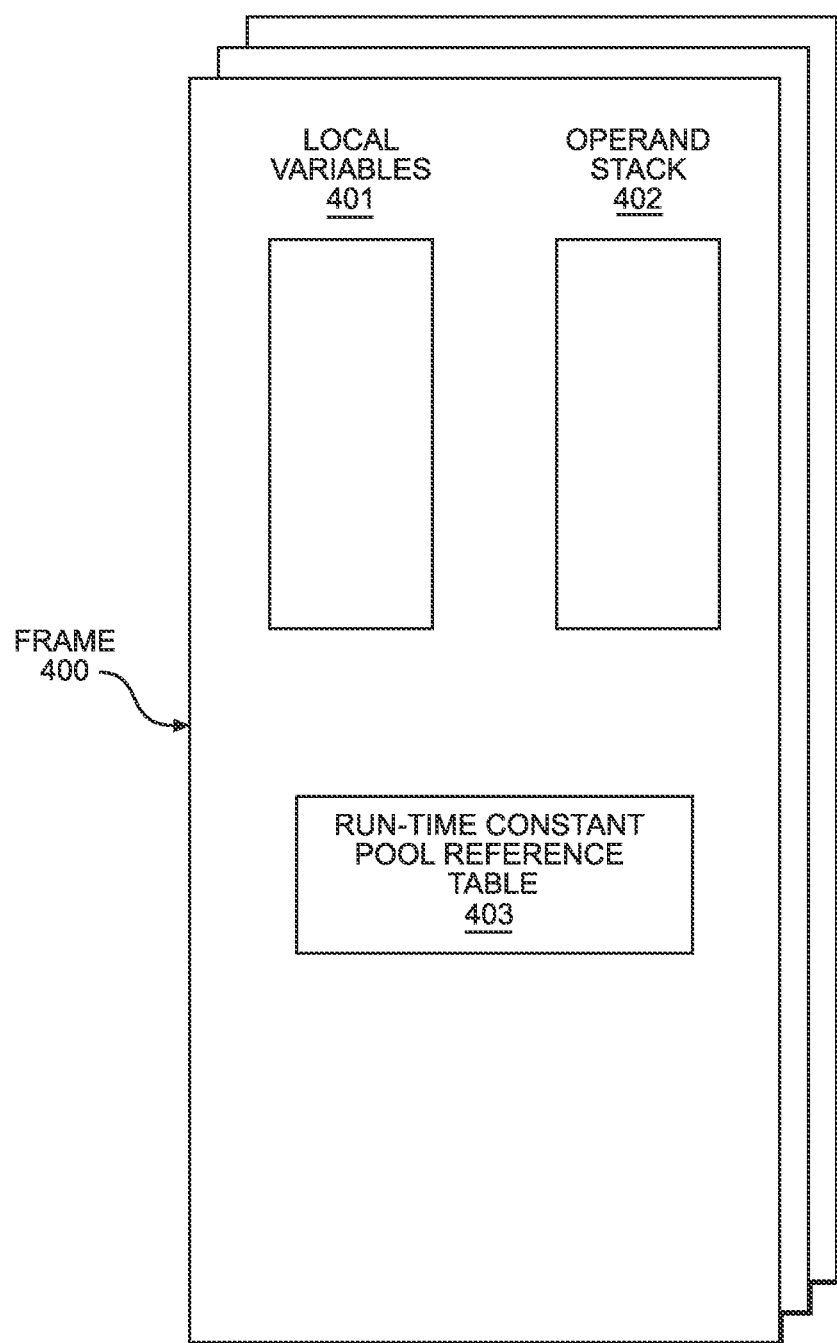
FIG. 4 is a block diagram illustrating an example frame according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class.

For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. STRUCTURED DATA OBJECT PROCESSOR METHOD HANDLE (SDOP_MH)

Figure 5:
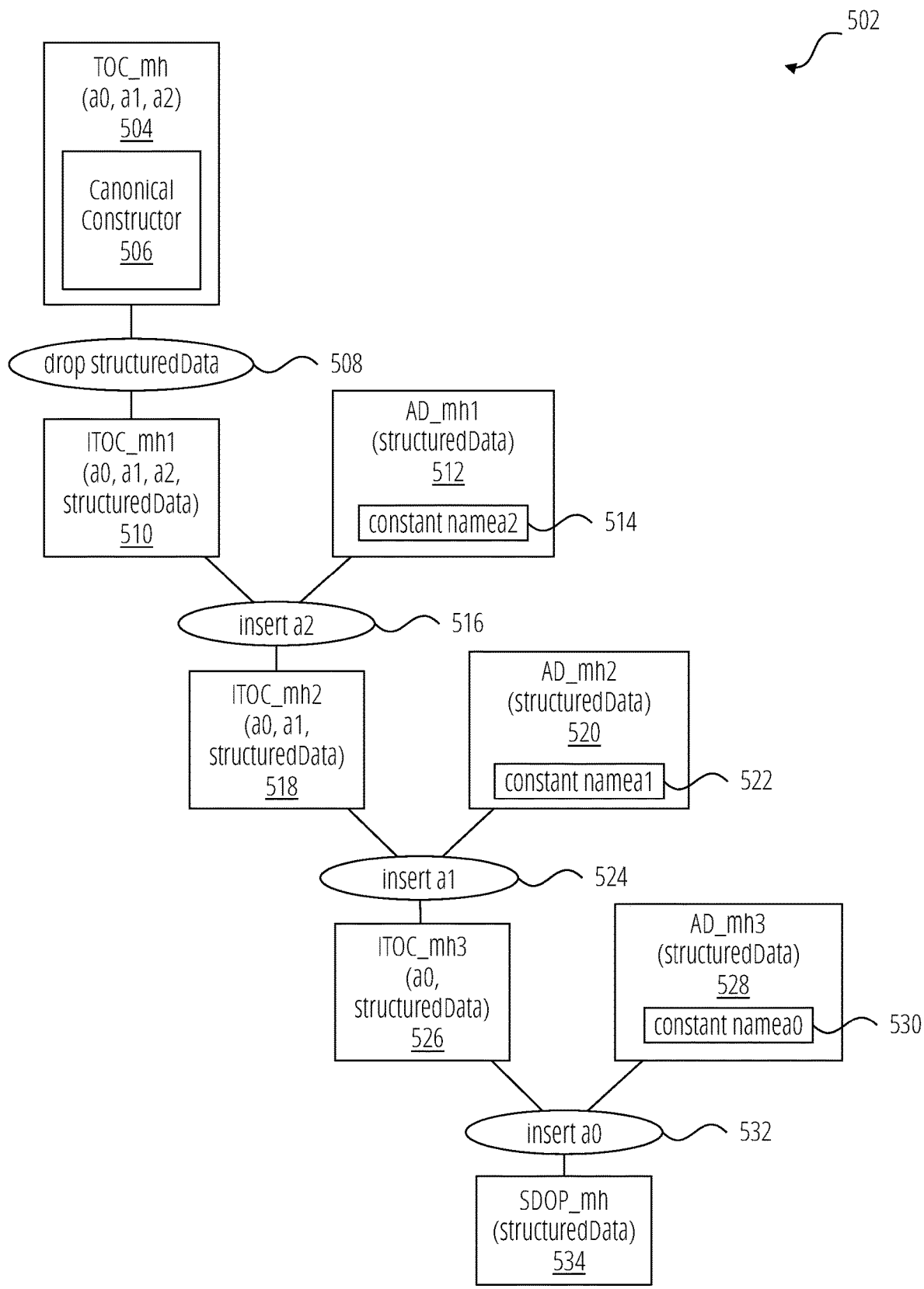
FIG. 5 illustrates an example method handle graph in accordance with one embodiment.

FIG. 5 illustrates an example method handle graph in accordance with one embodiment.

In one or more embodiments, a method handle graph 502 is a tree graph including a root node, leaf node, and zero or more intermediate nodes. As illustrated, a root node represents TOC_mh 504, a leaf node represents SDOP_mh 534, and intermediate nodes represent ITOC_mh1 510, ITOC_mh2 518, ITOC_mh3 526.

A method handle represented by a root node in a method handle graph is a "direct method handle," which is a direct reference to a method or constructor of a target class. The direct method handle may also be referred to as a "Target Object Creator method handle." Invoking a direct method handle is equivalent to invoking the method or constructor that the direct method handle refers to. The "method type" of a direct method handle is equivalent to that of the method or constructor that the direct method handle refers to. The term "method type" refers to the arity, order, and types of parameters and return type of a method handle or a method or a constructor.

A method handle mh of type t can be adapted to a new method type t' by creating an adapter method handle mh' that has method type t' and that delegates to the original target of mh. Arguments may be re-arranged, added to, or dropped. Additionally or alternatively, an adapter method handle mh' may insert a value at a specific argument position in the invocation of a method handle mh, where the inserted value is computed by an auxiliary method handle dh that is invoked when mh' is invoked. In such a case, the method type of mh' does not include a parameter representing the inserted value.

Each method handle represented in the method handle graph 502, except for the method handle represented by the root node, is an adaptation of one or more other method handles represented in the method handle graph 502. The method handles represented by the intermediate nodes may be referred to as "Intermediate Target Object Creator method handles." The method handle represented by the leaf node may be referred to as the "Structured Data Object Processor method handle." Various adapter functions may be used.

As illustrated, a method handle graph 502 shows a set of method handles for creating a target object based on a structured data object.

TOC_mh 504 is a direct method handle to a canonical constructor 506 of the target class. The target class declares, for example, three fields in the following sequence: a0, a1, a2. Hence, by definition of canonical constructors, the arguments to the canonical constructor 506 are the same fields in the same sequence: a0, a1, a2. Hence, by definition of a direct method handle, the arguments to TOC_mh 504 are the same fields in the same sequence: a0, a1, a2.

An adapter function drop 508 is used. The adapter function drop 508 takes a method handle mh with N parameters and produces a method handle mh' with N+1 parameters. When mh' is invoked, mh' will discard its N'th argument before calling the underlying method handle mh.

As illustrated, ITOC_mh1 510 is produced based on drop 508. The arguments to ITOC_mh1 510 are the same as TOC_mh 504, except ITOC_mh1 510 also includes a new argument structuredData. structuredData is the structured data object itself, or a data structure derived from the structured data object. In an embodiment, structuredData is a map pair, including a name-index map and an index-value map. The name-index map includes mappings between field names and a set of indices. The index-value map includes mappings between the set of indices and field values. Further details relating to map pairs are described below with reference to FIG. 7.

Next, an adapter function insert 516 is used. The adapter function insert 516 takes a method handle mh with N parameters as well as an auxiliary method handle dh. Based on mh and dh, the adapter function insert 516 produces a method handle mh' with N−1 parameters. When mh' is invoked with N−1 arguments, mh' will invoke dh using one or more of the N−1 arguments. Then mh' will call the underlying method handle mh with N arguments, namely the N−1 arguments passed to mh' followed by the newly computed value returned from dh.

As illustrated, ITOC_mh2 518 is produced based on insert 516. AD_mh1 512 (also referred to as an "Argument Discovery method handle") serves as an auxiliary method handle for insert 516. AD_mh1 512 is configured to "discover" the actual data for the field a2 of the target object based on structuredData. The argument to AD_mh1 512 is the same as an argument to ITOC_mh2 518, that is structuredData. AD_mh1 512 is further associated with a constant namea2 514, representing the field name of the field a2 of the target object. AD_mh1 512 identifies an index corresponding to the constant namea2 514 from the name-index map. AD_mh1 512 further identifies a field value corresponding to the identified index from the index-value map. AD_mh1 512 then returns the field value corresponding to the field a2. The return value from AD_mh1 512 is inserted as an argument a2 into ITOC_mh1 510, which is then invoked. Hence, ITOC_mh2 518 may be referred to as an adapter method handle that "inserts" the argument a2. The arguments to ITOC_mh2 518 are the same as ITOC_mh1 510, except that the argument a2 corresponding to the return value of AD_mh1 512 is not present.

The adapter functions insert 524 and insert 532 function similarly. Like AD_mh1 512, AD_mh2 520 and AD_mh3 528 are each auxiliary method handles and may be referred to as "Argument Discovery method handles." Each Argument Discovery method handle is configured to "discover" the actual data for a particular field of the target object based on structuredData. Each Argument Discovery method handle has structuredData as an argument. Each Argument Discovery method handle is associated with a constant field name corresponding to a particular field that the Argument Discovery method handle is configured to discover. As illustrated, AD_mh2 520 discovers the actual data for the field a1. Hence, AD_mh2 520 is associated with constant namea1 522, representing the field name of the field a1 of the target object. AD_mh3 528 discovers the actual data for the field a0. Hence, AD_mh3 528 is associated with constant namea0 530, representing the field name of the field a0 of the target object.

Hence, based on insert 524, the return value from AD_mh2 520 is inserted as an argument a1 into ITOC_mh2 518. The arguments to ITOC_mh3 526 are the same as ITOC_mh2 518, except that the argument a1 corresponding to the return value of AD_mh2 520 is not present.

Based on insert 532, the return value from AD_mh3 528 is inserted as an argument a0 into ITOC_mh3 526. The arguments to SDOP_mh 534 are the same as ITOC_mh3 526, except that the argument a0 corresponding to the return value of AD_mh3 528 is not present. Hence, the parameters of SDOP_mh 534 do not include any of the fields of the target object. Rather the parameters of SDOP_mh 534 correspond to structuredData.

"Direct" adaptation refers to an adapter method handle that is generated based on application of a single adapter function to a target method handle (and zero or more other method handles). "Indirect" adaptation" refers to an adapter method handle that is generated based on iterative applications of multiple adapter functions to respective target method handles. As illustrated, ITOC_mh1 510 may referred to as being adapted "directly" from TOC_mh 504; ITOC_mh2 518 may be referred to as being adapted "directly" from ITOC_mh1 510; ITOC_mh3 526 may be referred to as being adapted "directly" from ITOC_mh2 518; SDOP_mh 534 may be referred to as being adapted "directly" from ITOC_mh3 526. Additionally, each of ITOC_mh2 518, ITOC_mh3 526, and SDOP_mh 534 may be referred to as being adapted "indirectly" from TOC_mh 504.

The method handle graph 502 thus represents a function from a structured data object (represented by structuredData) to a target object. When creation of a target object based on a structured data object is desired, SDOP_mh 534 may be invoked using the structured data object as an argument. Invocation of SDOP_mh 534 in turn invokes each of the method handles in a method handle graph 502 until TOC_mh 504 is reached. Specifically, invocation of SDOP_mh 534 with one argument (structuredData) results in invocation of ITOC_mh3 526 with two arguments: a0 (computed by invoking AD_mh3 528 with argument structuredData) and streamData. The invocation of ITOC_mh3 526 results in invocation of ITOC_mh2 518 with three arguments: a0 (as passed to ITOC_mh3 526), a1 (computed by invoking AD_mh2 520 with argument structuredData), and streamData. The invocation of ITOC_mh2 518 results in invocation of ITOC_mh1 510 with four arguments: a0 (as passed to ITOC_mh2 518), a1 (as passed to ITOC_mh2 518), a2 (computed by invoking AD_mh1 512 with argument structuredData), and structuredData. The invocation of ITOC_mh1 510 results in invocation of TOC_mh 504 with three arguments: a0, a1, and a2 (all as passed to ITOC_mh1 510). The canonical constructor referenced by TOC_mh 504 is hence invoked, with the respective values of the structured data fields inserted as the arguments.

In an embodiment, the names of the structured data fields are the same as the names of the fields in the target class. Constant namea0 530, constant namea1 522, and constant namea2 514 may be determined based on the names of the first field, the second field, and the third field, respectively, as declared in the target class. Return values from the Argument Discovery method handles, respectively associated with constant namea0 530, constant namea1 522, and constant namea2 514, may be inserted as arguments of TOC_mh 504 in the same sequence. As an example, a target class may include the following fields in the following sequence: int xcoord; int ycoord; int zcoord. Hence, constant namea0 530 may be "xcoord"; constant namea1 522 may be "ycoord"; constant namea2 514 may be "zcoord." A return value from AD_mh3 528, which uses constant namea0 530, is inserted as a first argument to TOC_mh 504; a return value from AD_mh2 520, which uses constant namea1 522, is inserted as a second argument to TOC_mh 504; a return value from AD_mh1 512, which uses constant namea2 514, is inserted as a third argument to TOC_mh 504. The arguments, in the above listed sequence, are used for invoking the canonical constructor referenced by TOC_mh 504.

In another embodiment, the names of the structured data fields are different from the names of the fields in the target class. Constant namea0 530, constant namea1 522, and constant namea2 514 may be determined based on the names of the structured data fields as specified in the structured data object. Desired mappings between the structured data fields and the fields of the target class are obtained. Return values from the Argument Discovery method handles, respectively associated with constant namea0 530, constant namea1 522, and constant namea2 514, may be inserted as arguments of TOC_mh 504 based on the desired mappings. As an example, a target class may include the following fields in the following sequence: String name; int age; Address address. A structured data object may include the following structured data fields in the following sequence: mailingAddress; age; fullName. The desired mappings between the structured data fields and the target class fields may be as follows: fullName→name; age→age; mailingAddress→address. Hence, constant namea0 530 may be "fullName"; constant namea1 522 may be "age"; constant namea2 514 may be "mailingAddress." A return value from AD_mh3 528, which uses constant namea0 530, is inserted as a first argument to TOC_mh 504; a return value from AD_mh2 520, which uses constant namea1 522, is inserted as a second argument to TOC_mh 504; a return value from AD_mh1 512, which uses constant namea2 514, is inserted as a third argument to TOC_mh 504. The arguments, in the above listed sequence, are used for invoking the canonical constructor referenced by TOC_mh 504. In yet another argument, TOC_mh 504 references a constructor of the target class that is not necessarily a canonical constructor. The insertion of the return values from the Argument Discovery method handles may be accordingly rearranged based on desired mappings between the structured data fields and the parameters of the referenced constructor.

Different structured data objects of the same data format may be input to a same SDOP_mh 534 to create different target objects of the target class. The same SDOP_mh 534 may be used because (a) the names of the structured data fields are same for each structured data object of the same data format and (b) the constructor used for creating each object of the same target class is the same. The name of each structured data field is bound into the SDOP_mh 534 permanently.

Method handle graph 502 shows an example set of method handles for creating a target object based on a structured data object, where the target class includes three fields a0, a1, a2. For creating a different object of a different class including a different number of fields, a different number of adapter functions and auxiliary method handles may be used. Moreover, adapter functions and auxiliary method handles different than those in method handle graph 502 may be used. As an example, an adapter function that simultaneously inserts an argument and drops another argument may be used in place of insert 516 and drop 508.

4. INSTANTIATOR ARCHITECTURE

Figure 6:
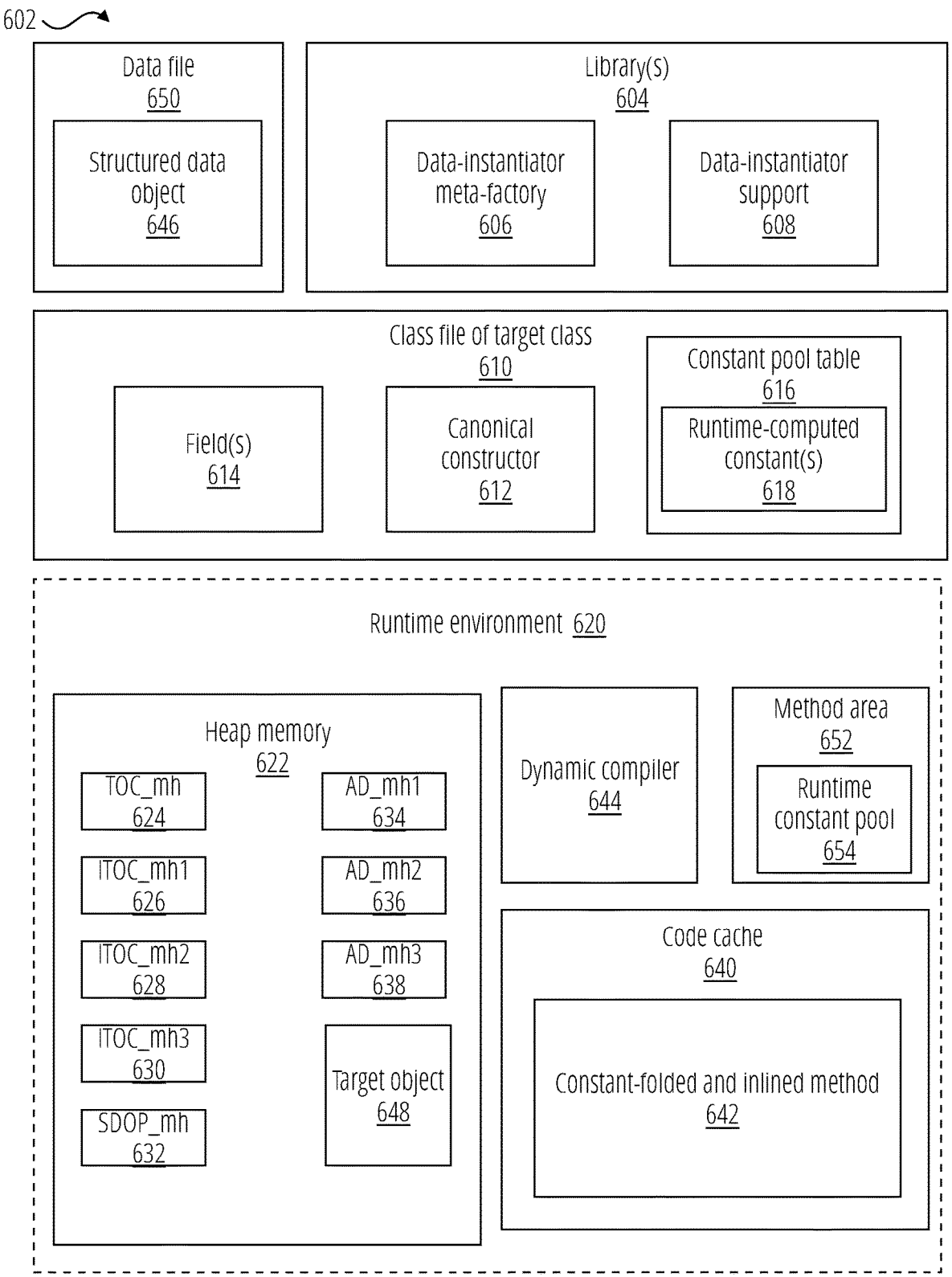
FIG. 6 illustrates an example instantiator architecture in accordance with one embodiment.

FIG. 6 illustrates an example instantiator architecture in accordance with one embodiment. FIG. 6 illustrates a system 602 in accordance with one or more embodiments. As illustrated in FIG. 6, system 602 includes a data file 650, libraries 604, a class file 610 of a target class, a heap memory 622, a dynamic compiler 644, a method area 652, and a code cache 640. In one or more embodiments, the system 602 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, a heap memory 622 represents the run-time data area from which memory for class instances and arrays is allocated. The heap memory 622 refers to data area reserved for allocation to objects created during runtime.

In one or more embodiments, a target object 648 refers to (a) an instance of a class created during runtime of a program and/or application, and/or (b) an object array. A class instance is generated by executing an explicit class instance creation expression. An object array is a container object that holds a fixed number of values of a single type. The object array is a particular set of class instances.

In one or more embodiments, a structured data object 646 is structured data that is convertible into an object within a heap memory 622. "Structured data" (also referred to as "parameterized data") is data that is organized into structured data fields, based on information type, in accordance with a given data format. Examples of data formats include JavaScript Object Notation (JSON), Extensible Markup Language (XML), and Comma Separated Values (CSV). Another data format involves a map pair, including a name-index map and an index-value map. Further details relating to map pairs are described below with reference to FIG. 7. A structured data object 646 may but does not necessarily specify a target class to be instantiated based on the structured data object 646. Additionally or alternatively, a structured data object 646 may but does not necessarily include a header that specifies a target class to be instantiated based on the structured data object 646.

Another example of a structured data object is a stream object. A stream object is a representation of a target object encoded as a stream of bytes. A stream object conforms with a particular format and/or structure known to a runtime environment 620. As an example, a stream object may begin with an object descriptor or keyword (such as "TC_OBJECT") indicating a start, within a byte stream, of a particular data set corresponding to a target object 648. The stream object may then indicate a class name of a target class of the target object 648, a number of fields within the target class, and the type and name of each field within the target class. The stream object may further include information associated with a parent class, and/or ancestor classes, of the target class. The stream object may further indicate the actual data corresponding to the fields of the target object 648. The stream object may specify the actual data corresponding to the fields in a particular sequence. For example, the sequence of the actual data for the fields in the stream object may follow the same sequence in which the fields are declared in a declaration of the target class. Alternatively, for example, the fields of the target class are separated into two groups: primitives and references. The stream object may first specify the actual data for the primitive fields, and then the actual data for the reference fields. The sequence of the actual data for primitive fields in the structured data object 646 may follow the same sequence in which the primitive fields are declared in a declaration of the target class. Separately, the sequence of the actual data for reference fields in the structured data object 646 may follow the same sequence in which the reference fields are declared in the declaration of the target class. The portion of the stream object that specifies actual data for a reference field may begin with the same object descriptor (such as "TC_OBJECT") indicating a start, within the byte stream, of a particular data set corresponding to an object. The portion of the stream object that specifies actual data for a reference field may be referred to as an "encapsulated stream object." The encapsulated stream object may follow the same format and/or structure as the original stream object representing the target object 648.

In an embodiment, a structured data object in any data format is convertible into a map pair. Further details regarding such conversion is described below with reference to Operations 1004 and 1006 of FIG. 10.

In one or more embodiments, a data file 650 is a file specifying one or more structured data objects 646. A data file 650 may conform with a particular format and/or structure known to a runtime environment 620. As an example, a data file 550 may include a header, which may include a keyword indicating the data file 650 includes one or more structured data objects 646. The data file 650 may then include one or more structured data objects 646, each beginning with a keyword or object descriptor (such as "TC_OBJECT") indicating the start of each data set corresponding to an individual object.

In one or more embodiments, a class file 610 of a target class includes an intermediate representation ("virtual machine code/instructions"), such as bytecode, of the target class. The class file 610 is generated by compiling a source file including source code specifying the target class. The class file 610 is executable by a virtual machine.

In an embodiment, a class file 610 specifies one or more fields 614, a canonical constructor 612, and one or more runtime-computed constants 618.

In an embodiment, a field 614 is a variable of any type that is declared explicitly in a declaration of a target class. A field 614 may be an instance field, for which every object of the target class has a respective individual value. The following is an example declaration of a class Point:

class Point {
   int x;
   int y;
}

In the above example, the names of fields 614 of the class Point are x and y. The types of the fields 614 are int and int.

In an embodiment, a canonical constructor 612 is a special type of constructor. A constructor of a target class is a method that, when executed, generates an instance of the target class.

A canonical constructor 612 is a constructor whose parameters are derived, in order, from the sequence of fields 614 of the target class. Namely, each successive parameter corresponds in name and type to each successive field in the target class. Referring to the above example, the declaration of the class Point declares a field x of type int, and then a field y of type int, so the canonical constructor 612 for the class Point has a parameter x of type int, and then a parameter y of type int.

In an embodiment, a canonical constructor 612 is included within a class file 610, regardless of whether the canonical constructor 612 is specified by a corresponding source file of a target class. A compiler generates the canonical constructor 612 when compiling the source file based on the fields 614 as declared within the target class. In an embodiment, a canonical constructor 612 is added within a class file 610 even though not included in a corresponding source file only if the target class is associated with certain attributes. As an example, a target class must be declared as a "record class" in order for the addition of a canonical constructor 612 to a corresponding class file 610 even though not included in a source file. Explicit declaration of a record class in the source file triggers generation of a canonical constructor during compilation. The following is an example declaration of a record class Point:

record Point (int x, int y) {
}

In the above example, in the declaration of the record class, the name of the record class is followed by a header in round parentheses. The header lists the "record components." The list is also referred to as the "record descriptor." Responsive to identifying a record class, a compiler generates the following: (a) a private final field for each record component; (b) an appropriately named public accessor method for each record component (for example, a public accessor named "x( )" for a record component named "x"); (c) "equals," "hashCode," and "toString" for the record class, based on the record components; and (d) the canonical constructor, with the same parameter list as that of the record descriptor. The parameter names, types, and order of the canonical constructor is identical to that of the record descriptor.

In one or more embodiments, a constant pool table 616 is a data structure which, among other functions, acts as a symbol table for the class. A constant pool table 616 of a target class specifies constant values used by the target class, such as literal numbers, strings, and runtime-computed constants 618.

In one or more embodiments, an entry within a constant pool table 616 for a runtime-computed constant 618 statically specifies an index into a bootstrap method table corresponding to a bootstrap method. The entry also statically specifies the type of the runtime-computed constant 618. Prior to runtime, a runtime-computed constant 618 is in an unresolved state. Resolution of a runtime-computed constant 618 is accomplished by calling a bootstrap method referenced by the index. The bootstrap method is given the static information content of the constant, and produces a value of the constant's statically declared type. The value of the constant is stored in a heap memory 622 and accessible for subsequent use through a runtime constant pool 654.

In one or more embodiments, a bootstrap method table (not illustrated) is a data structure associated with bootstrap methods for resolving runtime-computed constants 618. Like a constant pool table 616, a bootstrap method table is stored within a class file 610 and specific per-class. A bootstrap method table includes one or more entries, each corresponding to one or more runtime-computed constants 618. An entry in the bootstrap method table, for a particular runtime-computed constant 618, includes: (a) a reference to a particular bootstrap method that computes a value for the particular runtime-computed constant 618 during resolution of the runtime-computed constant 618; and (b) one or more arguments to the particular bootstrap method. The particular bootstrap method may be found in a library 604, such as a data-instantiator support 608, which is further discussed below. The arguments to a bootstrap method may further include one or more other runtime-computed constants 618, which would be resolved in a similar fashion.

Various implementations may be used as the bootstrap method that helps during resolution of a runtime-computed constant 618 that is an SDOP_mh 632. Example implementations are described below with reference to FIG. 8A and FIG. 8B. In an embodiment, each method handle in a method handle graph that is resolved as part of resolving SDOP_mh 632 is stored as an object in a heap memory 622, including a direct method handle TOC_mh 624 to a constructor of a target class, any intermediate method handles ITOC_mh1 626 ITOC_mh2 628. ITOC_mh3 630, SDOP_mh 632 itself, and any auxiliary method handles AD_mh1 634, AD_mh2 636, AD_mh3 638. A method handle that is a runtime-computed constant may be referred to as a "constant method handle." Each constant method handle is lazily resolved responsive to a request to access the constant method handle. Each constant method handle is not resolved until access to the constant method handle is requested. Constant method handles are not resolved during source code compilation, or when loading a class file 610 of a target class during runtime.

In one or more embodiments, a library 604 refers to code that is executable together with one or more target classes. A library 604 may be a part of a software development kit (SDK). In an embodiment, a data-instantiator meta-factory 606 and a data-instantiator support 608 may be within a single library 604 or different libraries 604.

In one or more embodiments, a data-instantiator meta-factory 606 refers to code embodying a main entry point for data instantiation. A data-instantiator meta-factory 606 includes a method for obtaining a Structured Data Object Processor method handle (SDOP_mh 632). A Structured Data Object Processor method handle may be regarded as a "factory" for creating a target object given a structured data object; therefore, any code that produces or otherwise helps to obtain a Structured Data Object Processor method handle may be regarded as a "meta-factory," since the code is a factory for a method handle that itself serves as a factory.

In particular, a data-instantiator meta-factory 606 includes a method for obtaining a constant SDOP_mh 632 from a runtime constant pool 654. If the SDOP_mh 632 is not yet generated, the data-instantiator meta-factory 606 accesses a bootstrap method (which may reside in another library 604, data-instantiator support 608) that resolves the SDOP_mh 632. If the SDOP_mh 632 is already generated, the data-instantiator meta-factory 606 retrieves and returns the SDOP_mh 632 from a heap memory 622. Examples of operations for obtaining an SDOP_mh 632 are described below with reference to FIG. 11. An SDOP_mh 632 is invoked to create a target object 648 based on a structured data object 646. Examples of operations for invoking an SDOP_mh 632 to create a target object 648 based on a structured data object 646 are described below with reference to FIG. 10.

In one or more embodiments, a data-instantiator support 608 refers to code embodying one or more bootstrap methods for resolving a runtime-computed constant 618 that is an SDOP_mh 632. A data-instantiator support 608 includes a graph generation bootstrap method for generating and adapting a direct method handle to a canonical constructor 612 in order to generate an SDOP_mh 632. A parameter to the graph generation bootstrap method is information identifying a target class of the target object to be created by the SDOP_mh 632. In some embodiments, the data-instantiator support 608 may include a separate discoverer generation bootstrap method for generating one or more Argument Discovery method handles. A parameter to the discoverer generation bootstrap method is a constant value representing a name of a structured data field corresponding to a field of the target class.

In one or more embodiments, a method area 652 (also referred to as a shared area) represents an area in memory where structures shared among the various threads executing on a virtual machine are stored. A method area 652 includes a runtime constant pool 654. In particular, a per-class area, associated with a target class, within a method area 652 stores a runtime constant pool 654 for the target class.

In one or more embodiments, a runtime constant pool 654 is a per-class runtime representation of the constant pool table 616 in a class file 610 of a target class. A runtime constant pool 654 includes several kinds of constants, such as numeric literals known at compile-time, method and field references resolved at runtime, and runtime-computed constants 618 resolved at runtime. One function of a runtime constant pool 654 is to serve as a symbol table. Another function of a runtime constant pool 654 is to store a reference to a resolved runtime-computed constant 618 that is stored in a heap memory 622.

In one or more embodiments, a dynamic compiler 644 is configured to compile an intermediate representation of code (such as bytecode), which is found in a class file 610, into native machine code during runtime. The dynamic compiler 644 may also perform optimization on the code during the compilation process. Optimizations may include inlining and constant folding. Inlining involves replacing an invocation of a method with a method body of the method. Constant folding involves replacing a constant expression with an actual constant value.

In an embodiment, a dynamic compiler 644 recognizes constants of a target class, including runtime-computed constants 618, as optimizable. As described above, SDOP_mh 632 is a runtime-computed constant 618 referenced from a runtime constant pool 654. Therefore a dynamic compiler 644 may elect to constant fold the value of SDOP_mh 632, and inline any code or executable logic that SDOP_mh 632 refers to. Inlined code may include method or constructor bodies associated with any method handles of a method handle graph associated with SDOP_mh 534, such as method handles represented by intermediate nodes of the method handle graph (ITOC_mh3 630, ITOC_mh2 628, ITOC_mh1 626), a method handle represented by a root node of the method handle graph (TOC_mh 624), and auxiliary method handles in the method handle graph (AD_mh1 634, AD_mh2 636, AD_mh3 638). Additionally or alternatively, the SDOP_mh 534 may be inlined into calling code.

In one or more embodiments, a code cache 640 refers to a memory space for storing native machine code generated by a dynamic compiler 644. After a dynamic compiler 644 compiles and optimizes an SDOP_mh 632, a code cache 640 stores the SDOP_mh 632 as a constant-folded and inlined method 642. The constant-folded and inlined method 642 has a method body that traverses a method handle graph associated with the SDOP_mh 632, starting with SDOP_mh 534 and ending with TOC_mh 624.

In one or more embodiments, a virtual machine (not illustrated) is configured to execute a class file 610, together with zero or more libraries 604. A virtual machine is implemented on one or more digital devices. The term "digital device" generally refers to any hardware device that includes a hardware processor. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In one or more embodiments, any component or information described herein, such as SDOP_mh 632, runtime-computed constants 618, and/or a constant-folded and inlined method 642, are stored in one or more same or separate data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as a virtual machine executing a class file 610. Alternatively or additionally, a data repository may be implemented or executed on a computing system separate from a virtual machine executing a class file 610. The data repository may be communicatively coupled to the virtual machine via a direct connection or via a network.

Figure 7:
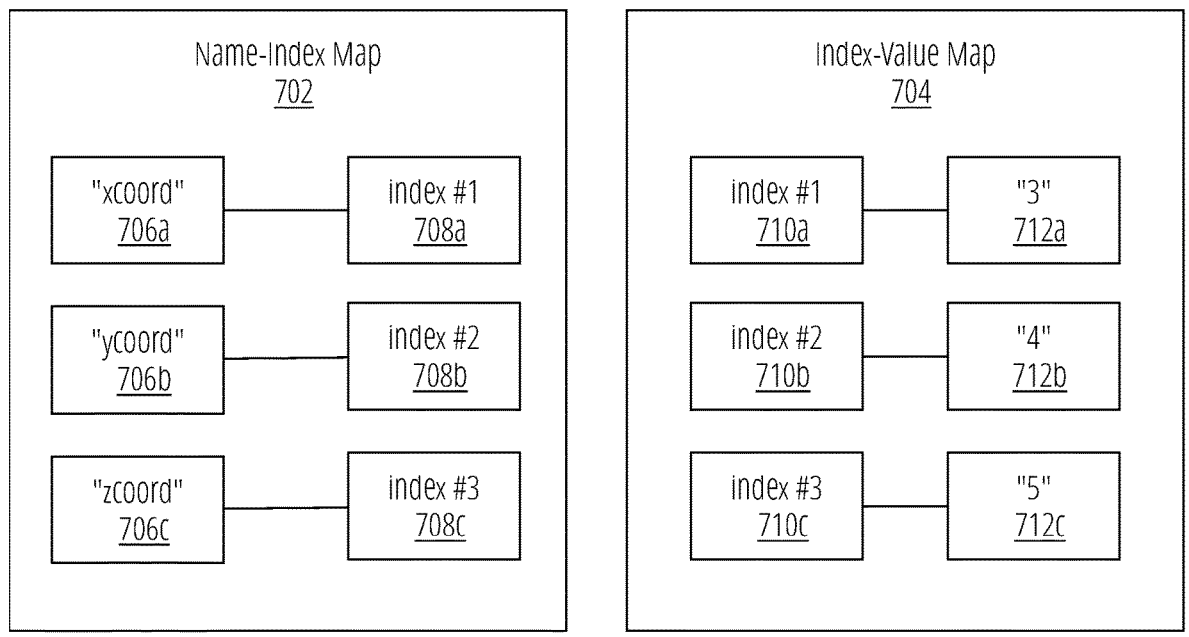
FIG. 7 illustrates an example set of structured data, including a name-index map and an index-value map, in accordance with one embodiment.

FIG. 7 illustrates an example set of structured data, including a name-index map and an index-value map, in accordance with one embodiment.

In an embodiment, a structured data object is represented as a map pair including a name-index map 702 and an index-value map 704. Name-index map 702 includes mappings between field names 706a-706c and indices 708a-708c. Index-value map 704 includes mappings between the indices 710a-710c and field values 712a-712c.

As illustrated, the field name "xcoord" maps to index #1 in name-index map 702. Index #1 maps to the field value "3" in index-value map 704. Hence, the structured data object includes a structured data field named "xcoord" with the value "3." Similarly, the structured data object also includes a structured data field named "ycoord" with the value "4," and another structured data field named "zcoord" with the value "5." Expressed differently, the structured data object may be represented as:
{
"xcoord"=3;
"ycoord"=4;
"zcoord"=5;
}

In an embodiment, a map pair does not include any entry for a structured data field where the value for the structured data field is the same as a default value for the corresponding field of the target class. A default value for a field of a target class is determined based on the type of the field. For example, a default value for int may be 0; a default value for String may be null; a default value for Boolean may be FALSE.

As an example, a structured data object may be:
{
"lightID"=3;
"turnedon"=FALSE;
}
A target class may include the fields: int lightID, bool turnedOn. The default value for variables of the type Boolean may be FALSE. Hence, the field value for the structured data field "turnedOn" is same as the default value for the target class field turnedOn (that is, FALSE).

Continuing the example, the structured data object may be represented as a map pair. The name-index map includes the following mappings:

"lightID"—1

The index-value map includes the following mappings:

1-3

As indicated in the above example, the map pair does not include any entry for "turnedOn."

Figure 8A:
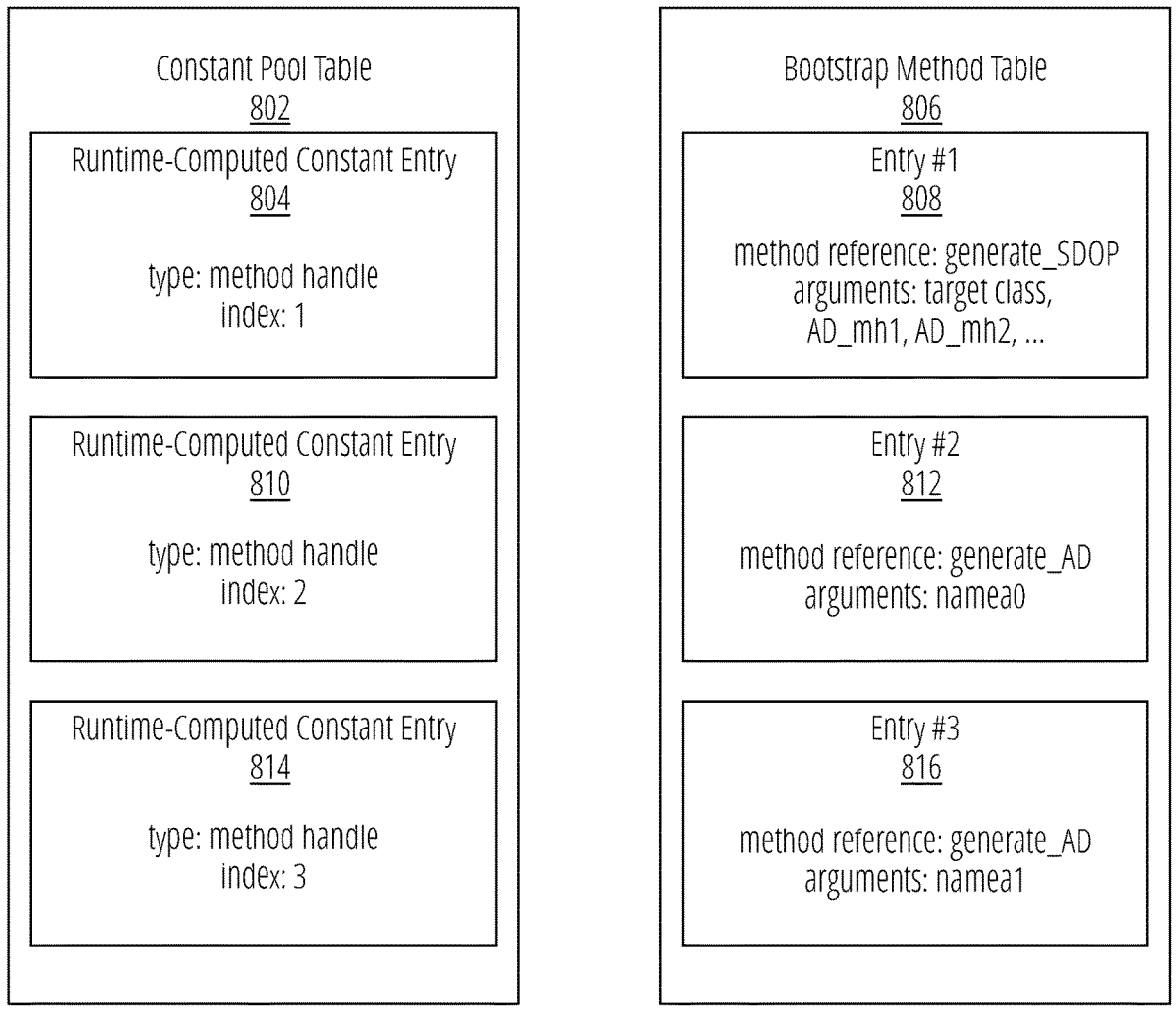
FIG. 8A illustrates an example implementation for resolving a runtime-computed constant that is an SDOP_mh in accordance with one embodiment.

FIG. 8A illustrates an example implementation for resolving a runtime-computed constant that is an SDOP_mh in accordance with one embodiment.

In an embodiment, an SDOP_mh for a target class, and each Argument Discovery method handle such as AD_mh1 and AD_mh2, are stored as separate runtime-computed constants. The SDOP_mh corresponds to runtime-computed constant entry 804 in constant pool table 802. Runtime-computed constant entry 804 specifies the type of the runtime-computed constant SOP_mh as "method handle," and the index of the associated entry in bootstrap method table 806 as "1." Now referring to bootstrap method table 806, entry #1 808 includes a method reference to the bootstrap method generate_SDOP, which may reside in a library, such as a data-instantiator support library. The return type of the bootstrap method generate_SDOP is "method handle," matching the type of the runtime-computed constant in runtime-computed constant entry 804. Entry #1 808 further includes arguments to the bootstrap method. Arguments include an object representing and/or indicating the target class, and one or more other runtime-computed constants corresponding to one or more Argument Discovery method handles, such as AD_mh1 and AD_mh2. The number of Argument Discovery method handles is equal to the number of fields of the target class.

Hence, resolving the constant SDOP_mh includes resolving one or more constant Argument Discovery method handles. AD_mh1 corresponds to runtime-computed constant entry 810. Runtime-computed constant entry 810 specifies the type of the runtime-computed constant AD_mh1 as "method handle," and the index of the associated entry in bootstrap method table 806 as "2." Now referring to bootstrap method table 806, entry #2 812 includes a method reference to the bootstrap method generate_AD, which may reside in a library, such as a data-instantiator support library. The return type of the bootstrap method generate_AD is "method handle," matching the type of the runtime-computed constant in runtime-computed constant entry 810. Entry #2 812 further includes arguments to the bootstrap method. Arguments include a field name namea0 corresponding to a field a0 of the target class. The bootstrap method generates AD_mh1, which is a reference to a method that returns a field value corresponding to the field name namea1 within a map pair.

Similarly, AD_mh2 corresponds to runtime-computed constant entry 814, and thereby entry #3 816. Entry #3 816 includes a method reference to the same bootstrap method generate_AD. However, entry #3 816 includes different arguments for the bootstrap method. Arguments include a field name namea1 corresponding to a field a1 of the target class. The bootstrap method generates AD_mh2, which is a reference to a method that returns a field value corresponding to the field name namea1 within the map pair.

After resolution of Argument Discovery method handles AD_mh1 and AD_mh2, the bootstrap method generate_SOP accepts AD_mh1 and AD_mh2 as arguments. The bootstrap method generate_SOP includes code for generating a direct method handle to a constructor of the target class, executing adapter functions using Argument Discovery method handles AD_mh1 and AD_mh2 as auxiliary method handles, and returning the SDOP_mh. The SDOP_mh is hence adapted indirectly from the direct method handle to the constructor.

Figure 8B:
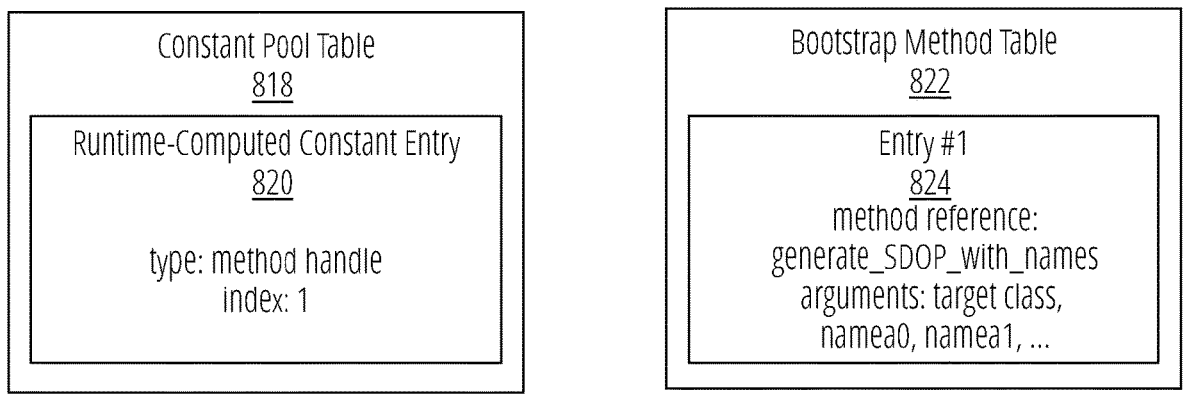
FIG. 8B illustrates another example implementation for resolving a runtime-computed constant that is an SDOP_mh in accordance with one embodiment.

FIG. 8B illustrates another example implementation for resolving a runtime-computed constant that is an SDOP_mh in accordance with one embodiment.

In an embodiment, an SDOP_mh for a target class is a runtime-computed constant. Each Argument Discovery method handle such as AD_mh1 and AD_mh2 is generated within a bootstrap method for resolving the SDOP_mh.

The SDOP_mh corresponds to runtime-computed constant entry 820 in constant pool table 818. Runtime-computed constant entry 820 specifies the type of the runtime-computed constant SOP_mh as "method handle," and the index of the associated entry in bootstrap method table 822 as "1." Now referring to bootstrap method table 822, entry #1 824 includes a method reference to the bootstrap method generate_SDOP_with_names, which may reside in a library, such as a data-instantiator support library. The return type of the bootstrap method generate_SDOP_with_names is "method handle," matching the type of the runtime-computed constant in runtime-computed constant entry 820. Entry #1 824 further includes arguments to the bootstrap method. Arguments include an object representing and/or indicating the target class, and one or more field names corresponding to fields of the target class. For example, the arguments may include namea0 and namea1 corresponding to the fields a0 and a1 respectively.

The bootstrap method generate_SDOP_with_names accepts namea0 and namea1 as arguments. The bootstrap method generate_SDOP_with_names includes code for generating a direct method handle to a constructor of the target class, generating Argument Discovery method handles AD_mh1 and AD_mh2, executing adapter functions using Argument Discovery method handles AD_mh1 and AD_mh2 as auxiliary method handles, and returning the SDOP_mh. Generating AD_mh1 involves generating a reference to a method that returns a field value corresponding to the field name namea0 within a map pair. Generating AD_mh2 involves generating a reference to a method that returns a field value corresponding to the field name namea1 within the map pair. The SDOP_mh is hence adapted indirectly from the direct method handle to the constructor.

Yet another example implementation (not illustrated) for resolving a runtime-computed constant that is an SDOP_mh is similar to FIG. 8B but the arguments listed in entry #1 824 do not include the field names. The bootstrap method is generate_SDOP_from_derivation (rather than generate_SDOP_with_names) and may include code for determining the field names as part of generating Argument Discovery method handles AD_mh1 and AD_mh2. The field names are determined based on the fields as declared in the target class. Additionally or alternatively, the field names are determined based on the fields as specified and/or indicated by the structured data object.

5. COMPILING A CLASS TO SUPPORT INSTANTIATION BASED ON STRUCTURED DATA

Figure 9:
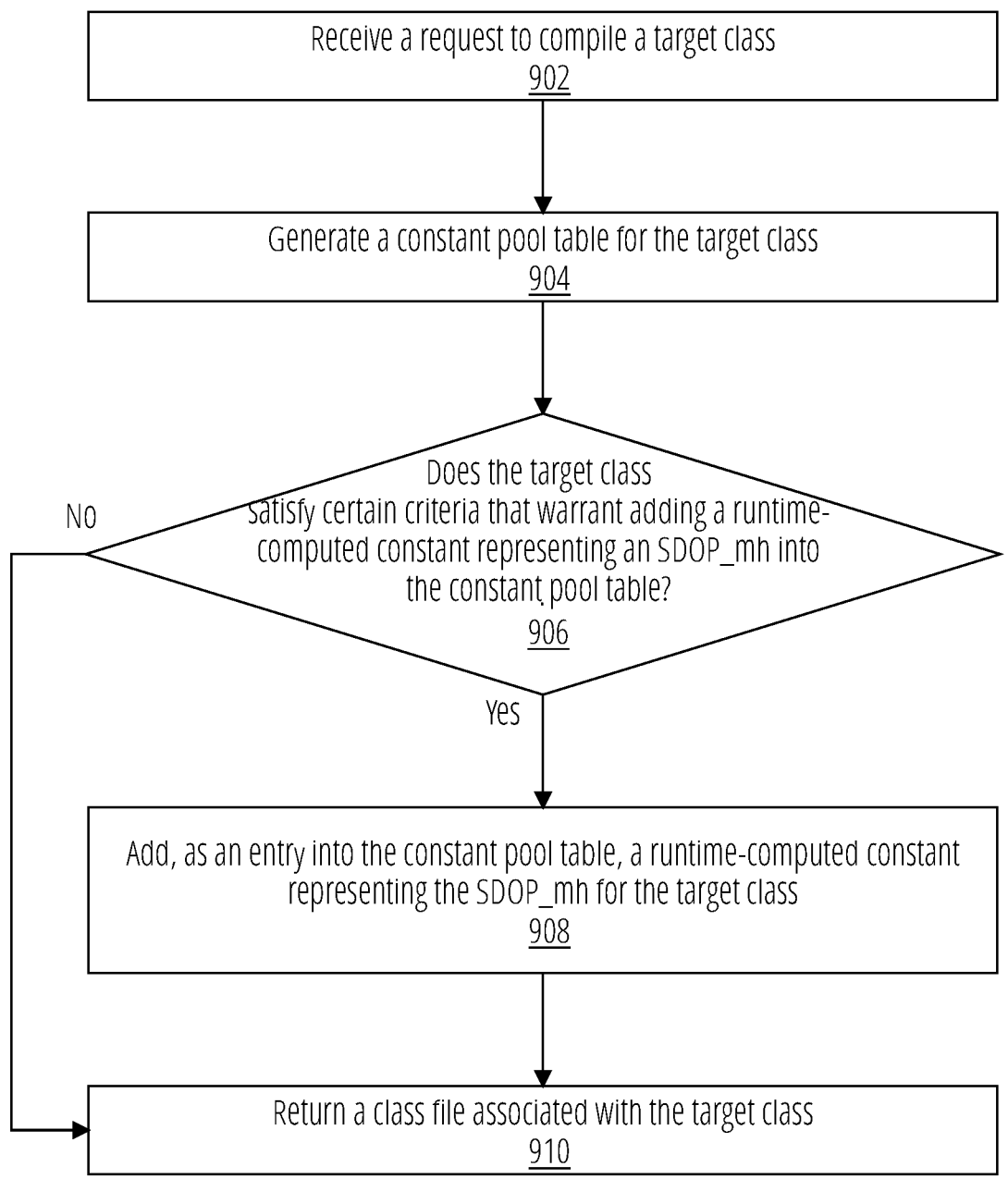
FIG. 9 illustrates an example set of operations for compiling a target class in accordance with one embodiment.

FIG. 9 illustrates an example set of operations for compiling a target class in accordance with one embodiment. One or more operations illustrated in FIG. 9 may be modified, rearranged, or omitted all together. Accordingly, the particular sequence of operations illustrated in FIG. 9 should not be construed as limiting the scope of one or more embodiments.

One or more embodiments include receiving a request to compile a target class (Operation 902). A compiler receives a request to compile source code of a target class into an intermediate representation such as bytecode.

One or more embodiments include generating a constant pool table for the target class (Operation 904). As part of compiling the target class, the compiler generates a constant pool table for the target class. The compiler analyzes the source code for any constants and stores the constants in a constant pool table.

One or more embodiments include determining whether the target class satisfies certain criteria that warrant adding a runtime-computed constant representing an SDOP_mh into the constant pool table (Operation 906). The compiler determines whether the target class satisfies certain criteria that warrant adding a runtime-computed constant representing an SDOP_mh (also referred to as a constant SDOP_mh) into the constant pool table, even if the constant SDOP_mh is not explicitly referenced in the source code.

A criterion warranting addition of the constant SDOP_mh to the constant pool table is that the target class has a canonical constructor. The criterion requires that the fields of the target class are the same as the arguments to a constructor of the target class, and the sequence of the fields as declared in a declaration of the target class is the same as a sequence of the corresponding arguments to the constructor.

If the criteria is satisfied, one or more embodiments include adding, as an entry into the constant pool table, a runtime-computed constant representing the SDOP_mh for the target class (Operation 908). The compiler adds a constant SDOP_mh to the constant pool table, even if the source code does not explicitly declare the constant SDOP_mh. Adding the constant SDOP_mh includes adding an entry in the constant pool table for a runtime-computed constant that specifies an index into a bootstrap method table, generating the bootstrap method table (if not yet generated), and adding an entry in the bootstrap method table at the specified index that specifies (a) a bootstrap method that is invoked for resolution of the constant SDOP_mh and (b) zero or more arguments to the bootstrap method.

In an embodiment, the compiler further adds one or more runtime-computed constants representing Argument Discovery method handles. One constant Argument Discovery method handle is added for each field in the target class. Adding a constant Argument Discovery method handle includes adding an entry in the constant pool table for a runtime-computed constant that specifies an index into a bootstrap method table, and adding an entry in the bootstrap method table at the specified index that specifies (a) a bootstrap method that is invoked for resolution of the constant Argument Discovery method handle and (b) zero or more arguments to the bootstrap method.

In an embodiment, the compiler determines the names of structured data fields, within an expected structured data object, corresponding to respective fields of the target class. The compiler determines the names and sequence of the structured data fields based on the fields as declared in the target class. Additionally or alternatively, the compiler determines the names and sequence of the structured data fields based on a data format of the expected structured data object. The compiler inserts the field names as arguments to either the bootstrap method for resolving the constant SDOP_mh or the bootstrap methods for resolving the Argument Discovery method handles. In another embodiment, a runtime environment determines the field names during runtime-computed constant resolution, as further described below with reference to Operation 1114 in FIG. 11.

One or more embodiments include returning a class file associated with the target class (Operation 910). The compiler returns a class file including the intermediate representation of the target class. The class file includes the constant pool table and if necessary the bootstrap method table. The class file is executable by a virtual machine.

6. CREATING A TARGET OBJECT BASED ON A STRUCTURED DATA OBJECT

Figure 10:
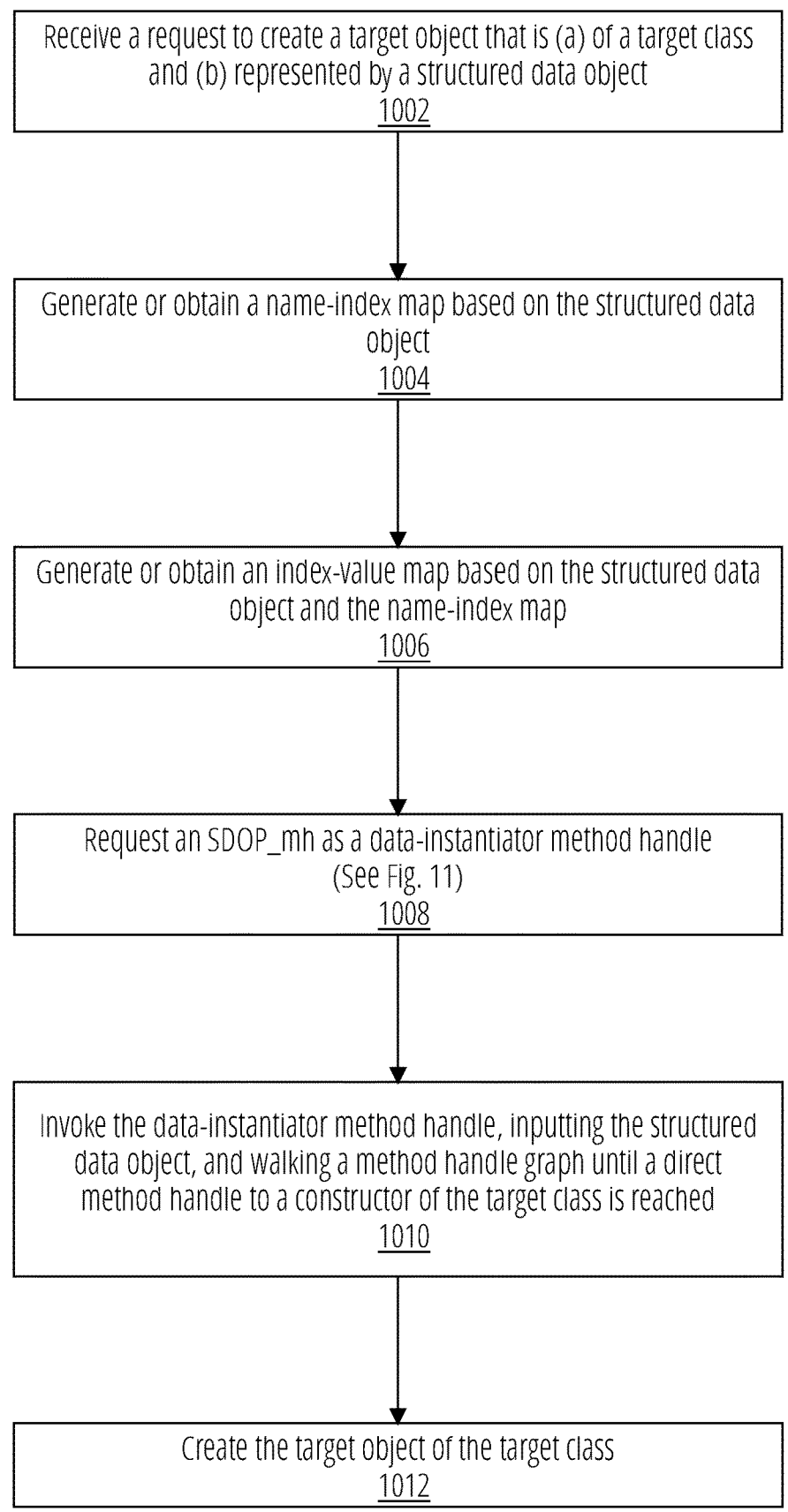
FIG. 10 illustrates an example set of operations for creating a target object in accordance with one embodiment.

FIG. 10 illustrates an example set of operations for creating a target object in accordance with one embodiment. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments include receiving a request to create a target object represented by a structured data object (Operation 1002). A runtime environment receives a request to create a target object represented by a structured data object. The request may be specified in a class file being executed by the runtime environment.

The request specifies or indicates the structured data object. The structured data object may be but is necessarily in map pair format.

In an embodiment, the request, the structured data object, or a header of the structured data object, explicitly denotes a non-abstract class that serves as the target class. In another embodiment, the request, the structured data object, or a header of the structured data object, explicitly denotes a target interface, or a target abstract class, that can be used to determine the target class. Since interfaces and abstract classes cannot be instantiated directly, the target interface or target abstract class cannot itself serve as the target class. Hence, the structured data object and the header of the structured data object may but do not necessarily explicitly denote the target class.

One or more embodiments include obtaining a name-index map based on the structured data object (Operation 1004). In an embodiment, the structured data object included in the request is in map pair format. Therefore the structured data object includes a name-index map.

In an embodiment, the runtime environment may modify the names in the name-index map to match the names of the fields of the target class, if not already matching. As an example, a request may include a structured data object, which may include a name-index map including the following mappings:

name—1
age—3
title—2

A target class may declare the following fields in the following sequence: String fullName, String job, int age. A runtime environment may determine desired mappings between the structured data fields and the fields of the target class. Based on the desired mappings, the runtime environment may modify the name-index map to indicate as follows:

fullName—1
age—3
job—2

In another embodiment, the structured data object included in the request is not in map pair format. The runtime environment converts the structured data object into map pair format.

The runtime environment parses the structured data object to identify names of structured data fields. As an example, a request may include a structured data object in JSON format. The structured data object may be for example: {"name": "Skyler", "age":25, "title":null}. A runtime environment may parse the structured data object to identify the structured data field names: "name," "age," and "title."

The runtime environment assigns an index to each structured data field name. The runtime environment may assign indices to structured data field names randomly. Alternatively the runtime environment may assign indices to structured data field names based on the sequence of the fields as declared in the target class. As an example, a request may include a structured data object in JSON format. The structured data object may be for example: {"name":"Skyler", "age":25, "title":null}. A target class may declare the following fields in the following sequence: String name, String title, int age. The runtime environment may determine that the structured data field name "name" is same as the first field name declared in the target class. Hence the runtime environment may assign an index of 1 to "name." The runtime environment may determine that the structured data field name "age" is same as the third field name declared in the target class. Hence the runtime environment may assign an index of 3 to "age." The runtime environment may determine that the structured data field name "title" is same as the second field name declared in the target class. Hence the runtime environment may assign an index of 2 to "title." As another example, a request may include a structured data object in JSON format. The structured data object may be same as the former example: {"name":"Skyler", "age":25, "title":null}. A target class may declare the following fields in the following sequence: String firstName, String job, int age. The runtime environment may determine desired mappings between each structured data field name and each target class field name. The runtime environment may determine the desired mappings based on user input, natural language processing (NLP), and/or other methods. The runtime environment may determine that the structured data field name "name" maps to the first field name declared in the target class. Hence the runtime environment may assign an index of 1 to "name." The runtime environment may determine that the structured data field name "age" maps to the third field name declared in the target class. Hence the runtime environment may assign an index of 3 to "age." The runtime environment may determine that the structured data field name "title" maps to the second field name declared in the target class. Hence the runtime environment may assign an index of 2 to "title."

The runtime environment creates a table or another data structure storing the mappings between the structured data field names and the assigned indices. The data structure storing the mappings is a name-index map. Referring to the example above, the runtime environment may create a name-index map including the following mappings:

name—1
  age—3
  title—2

One or more embodiments include obtaining an index-value map based on the structured data object and the name-index map (Operation 1006). In an embodiment, the structured data object included in the request is in map pair format. Therefore the structured data object includes a name-index map.

In another embodiment, the structured data object included in the request is not in map pair format. The runtime environment converts the structured data object into map pair format.

The runtime environment parses the structured data object to identify a value for each structured data field name. As an example, a request may include a structured data object in JSON format. The structured data object may be for example: {"name":"Skyler", "age":25, "title":null}. A runtime environment may parse the structured data object to identify the following values for the structured data field names: the value for "name" is "Skyler;" the value for "age" is 25; and the value for "title" is null.

The runtime environment identifies an index corresponding to each structured data field name based on the name-index map. The runtime environment assigns the identified index to each corresponding structured data field value. As an example, a request may include a structured data object in JSON format. The structured data object may be for example: {"name":"Skyler", "age":25, "title":null}. A runtime environment may create a name-index map including the following mappings:

name—1
  age—3
  title—2

Continuing the example, the runtime environment may determine that the structured data object indicates the value "Skyler" for the structured data field name "name." The runtime environment may determine that the name-index map indicates the index 1 for the structured data field name "name." Hence the runtime environment may assign the index 1 to the value "Skyler." Similarly, the runtime environment may assign the index 3 to the value 25, and the index 2 to the value null.

The runtime environment creates a table or another data structure storing the mappings between the structured data field values and the assigned indices. The data structure storing the mappings is an index-value map. Referring to the example above, the runtime environment may create an index-value map including the following mappings:

1—"Skyler"
  2—null
  3—25

One or more embodiments include requesting an SDOP_mh as a data-instantiator method handle (Operation 1008). A "data-instantiator method handle" of a target class refers to a method handle that accepts a data structure (such as a map pair) representing a target object and returns the target object of the target class. Other types of data-instantiator method handles include Constant Stream Object Processor method handles (SOP_mh) and Non-Constant Stream Object Processor method handles (NC_SOP_mh), discussed in the related U.S. patent application Ser. No. 17/171,254, filed Feb. 9, 2021.

The runtime environment executes a method to obtain an SDOP_mh from a runtime constant pool. The method may reside in a library, such as a data-instantiator meta-factory library. The following is an example request for an SDOP_mh for the class Point:

MethodHandle
    SDOP_mh=DataInstantiatorMetaFactory.getFactoryFor
    (Point.class);

Examples of operations for obtaining an SDOP_mh are described below with reference to FIG. 11.

One or more embodiments include invoking the data-instantiator method handle, inputting the structured data object, and walking a method handle graph until a direct method handle to a constructor of the target class is reached (Operation 1010).

The runtime environment identifies a request to invoke the data-instantiator method handle. The invocation request inputs the data structure representing the target object into the data-instantiator method handle. The following is an example request to invoke an SDOP_mh for the class Point, inputting a name-index map and an index-value map representing a structured data object:

var point=(Point)SDOP_mh.invokeExact(nameIndex-Map, indexValueMap);

Responsive to identifying the invocation request, the runtime environment walks through a method handle graph of the data-instantiator method handle to match each structured data field to the appropriate argument of the constructor, and invoke the constructor to create the target object.

The runtime environment first processes the data-instantiator method handle itself. The data-instantiator method handle is an adapter method handle that adapts a target method handle mha. The data-instantiator method handle inserts a data value returned from an Argument Discovery method handle for the field a0 of the target class as an argument into the target mha. The Argument Discovery method handle accepts the structured data as an argument.

Then the Argument Discovery method handle "discovers" the value of the field a0. The Argument Discovery method handle for a0 is associated with a field name namea0 for a0. The field name namea0 is a constant value for the Argument Discovery method handle for a0. The Argument Discovery method handle determines an index corresponding to the field name namea0, as indicated by the name-index map. The Argument Discovery method handle determines a value corresponding to the index, as indicated by the index-value map. Hence, the Argument Discovery method handle returns the value extracted from the structured data corresponding to the field name namea0.

Then the runtime environment invokes the target mha, inserting the result from the Argument Discovery method handle into a position within an argument list of mha corresponding to a0. The runtime environment thereby matches the structured data field for a0 to a constructor parameter for a0.

Within the context of invoking the intermediate method handle mha, mha is now an adapter method handle that adapts another target method handle mhb. The runtime environment continues walking through method handles of the method handle graph. Each method handle inserts an additional argument into the constructor referenced by the direct method handle of the method handle graph. The runtime environment thereby matches each structured data field to an appropriate constructor parameter.

Then the runtime environment reaches a particular method handle mhc in the method handle graph. The method handle mhc is an adapter method handle that discards the structured data as an argument before calling a target method handle mhd. Method handle mhd is the direct method handle to the constructor of the target class.

The runtime environment invokes the target mhd, using the results previously returned from the series of Argument Discovery method handles as arguments to mhd. Since mhd is a direct method handle, the referenced constructor is invoked. The results previously returned from the series of Argument Discovery method handles are inserted as arguments to the constructor.

One or more embodiments include creating the target object of the target class (Operation 1012). Based on the invocation of the constructor of the target class, the runtime environment creates the target object of the target class. The runtime environment allocates memory space within a heap memory for the target object. The runtime environment generates the target object and stores the target object in the allocated space within the heap memory.

7. OBTAINING A CONSTANT SDOP_MH FROM A RUNTIME CONSTANT POOL

Figure 11:
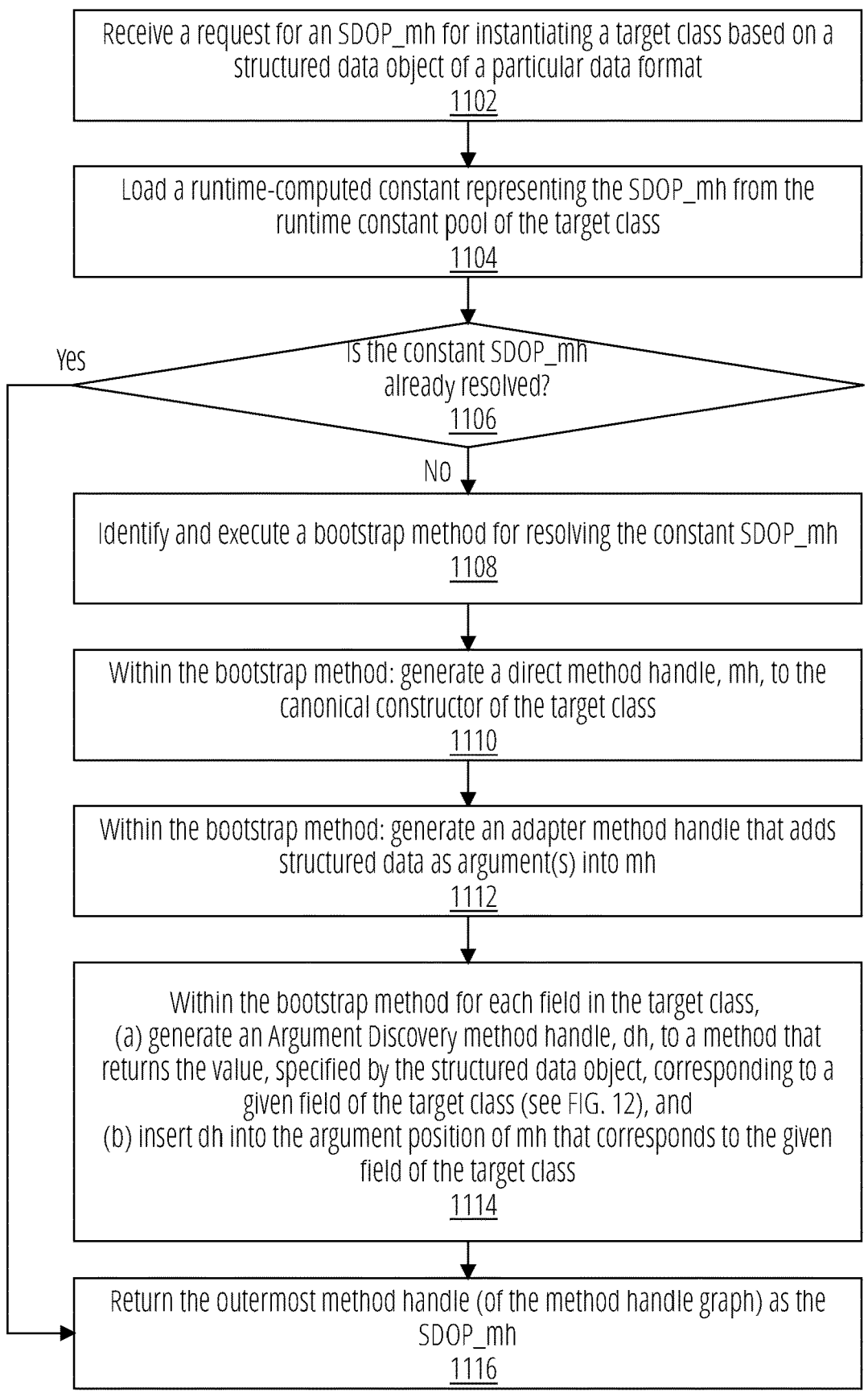
FIG. 11 illustrates an example set of operations for generating and returning an SDOP_mh in accordance with one embodiment.

FIG. 11 illustrates an example set of operations for generating and returning a Structured Data Object Processor method handle in accordance with one embodiment. One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments include receiving a request for an SDOP_mh for instantiating a target class based on a structured data object of a particular data format (Operation 1102). A runtime environment receives a request for an SDOP_mh for instantiating a target class based on a structured data object of a particular data format. The request may invoke a get-SDOP_mh method within a library, such as a data-instantiator meta-factory library. The request may input an object representing and/or indicating the target class into the get-SDOP_mh method. The request may input an object representing and/or indicating the data format of the structured data object into the get-SDOP_mh method.

One or more embodiments include loading a runtime-computed constant representing the SDOP_mh (also referred to as a "constant SDOP_mh") from the runtime constant pool of the target class (Operation 1104). Various ways of loading the constant SDOP_mh may be used, as follows.

In an embodiment, the get-SDOP_mh method uses a modern bytecode-reading application programming interface (API) to inspect the target class's runtime constant pool. The runtime environment, executing the get-SDOP_mh method, obtains a particular object representing the runtime-computed constant entry that embodies the constant SDOP_mh.

In another embodiment, the target class offers an accessor method that inspects the target class's runtime constant pool and returns the SDOP_mh. The accessor method when invoked for the first time triggers the resolution of the runtime-computed constant; subsequent invocations return the same method handle object. The get-SDOP_mh method reflectively invokes the accessor method to load the constant SDOP_mh.

One or more embodiments include determining whether the constant SDOP_mh is already resolved (Operation 1106). The runtime environment determines whether the constant SDOP_mh for instantiating the target class based on a structured data object of the particular data format is already resolved. If the bootstrap method for the constant SDOP_mh was previously invoked, then the constant SDOP_mh is resolved and stored in a heap memory. The runtime environment need not generate the constant SDOP_mh again. The runtime environment may reuse the constant SDOP_mh to create any object of the target class.

One or more embodiments include identifying and executing a bootstrap method for resolving the constant SDOP_mh (Operation 1108). The runtime environment inspects the runtime-computed constant entry, within the runtime constant pool, embodying the constant SDOP_mh. The runtime environment determines an index into a bootstrap method table referenced from the runtime-computed constant entry. The runtime environment inspects the indexed entry within the bootstrap method table. The runtime environment determines a reference to a graph generation bootstrap method referenced from the indexed entry. The graph generation bootstrap method may reside in a library, such as a data-instantiator support library.

In an embodiment, the following Operations 1110-1114 are performed by the runtime environment while executing the graph generation bootstrap method.

One or more embodiments include generating a direct method handle mh to the canonical constructor of the target class (Operation 1110). The runtime environment generates a direct method handle mh to the canonical constructor of the target class. The direct method handle may be generated via a reflective API.

One or more embodiments include generating an adapter method handle mh' that adds structured data as argument(s) into mh (Operation 1112). The runtime environment generates an adapter method handle mh' by applying an adapter function onto a target method handle mh. The adapter function adds structured data as one or more arguments into the target mh. The following is an example instruction for generating the adapter method handle mh' that has additional argument(s):

MethodHandle mh'=dropArguments(mh, 0, nameIndexMapDataType, indexValueMapDataType);

In the above example, mh is a target method handle, 0 is the position of the first argument to be dropped, nameIndexMapDataType and indexValueMapDataType are the class types of the name-index map and index-value map respectively.

One or more embodiments include, for each field of the target class, (a) generating an Argument Discovery method handle dh to a method that returns the value, specified by the structured data object, corresponding to a given field of the target class, and (b) inserting dh into the argument position of mh that corresponds to the given field of the target class (Operation 1114). The runtime environment traverses through each field of the target class. Each traversal of a field of the target class involves (a) generating an Argument Discovery method handle dh to a method that returns the value, specified by the structured data object, corresponding to the field, and (b) inserting dh into the argument position of mh that corresponds to the field. Further details regarding the two steps are described below.

First, the runtime environment generates an Argument Discovery method handle dh for a particular field a of the target class.

In an embodiment, the Argument Discovery method handle is a runtime-computed constant that is input as an argument into the graph generation bootstrap method. The runtime environment loads the constant Argument Discovery method handle. Operations for loading the constant Argument Discovery method handle are similar to operations for loading the constant SDOP_mh described above with reference to Operations 1104-1108. The runtime environment identifies, in an entry of the bootstrap method table, (a) a discoverer generation bootstrap method, and (b) argument(s) to the discoverer generation bootstrap method. The arguments may include a name of a structured data field corresponding to the particular field a. Alternatively, the runtime environment may determine the structured data field name within the discoverer generation bootstrap method.

The structured data field name may be determined based on the data format of the structured data object, the names as specified by the structured data object itself, and/or another method. If the names of the structured data fields are known to match the names of the fields of the target class, the structured data field name may be determined based on the name of the corresponding field a itself. The runtime environment executes the discoverer generation bootstrap method and returns the constant Argument Discovery method handle for the particular field a. Further details regarding generating and returning an Argument Discovery method handle are described below with reference to FIG. 12.

In another embodiment, the Argument Discovery method handle is generated within the graph generation bootstrap method. The arguments to the graph generation bootstrap method, as specified by an entry to the bootstrap method table, may include a name of a structured data field corresponding to the particular field a. Alternatively, the runtime environment may determine the structured data field name within the graph generation bootstrap method.

Second, the runtime environment inserts dh into the argument position of mh that corresponds to the particular field a. The runtime environment generates an adapter method handle mh" by applying an adapter function onto a target method handle mh'. The adapter function inserts dh into an argument position of a target method handle mh', which corresponds to the argument position of mh that corresponds to the particular field a. The following is an example instruction for generating the adapter method handle mh" that inserts an argument dh:

MethodHandle mh"=foldArguments(mh', dh);

Finally, the runtime environment completes traversal of all fields of the target class. The last generated adapter method handle has only the binary data as argument(s), and does not include any fields of the target class as an argument.

One or more embodiments include returning the outermost method handle (of the method handle graph) as the SDOP_mh (Operation 1116). The runtime environment returns the outermost method handle of the method handle graph as the SDOP_mh. The SDOP_mh is thus adapted, indirectly, from the direct method handle to the canonical constructor of the target class.

In an embodiment, a dynamic compiler of the runtime environment recognizes the SDOP_mh as a constant that is optimizable. The dynamic compiler hence performs constant-folding and/or inlining on the SDOP_mh.

In one or more embodiments (not illustrated), a SDOP_mh is not a runtime-computed constant and does not reside in a runtime constant pool. Instead of executing a bootstrap method for a runtime-computed constant, the runtime environment may execute a particular library method for generating the SDOP_mh. The library method performs similar operations as the bootstrap method referenced at Operations 1110-1114. The library method returns the SDOP_mh, which is then stored into the heap memory. When receiving a request for the SDOP_mh to instantiate the target class based on a structured data object of a particular data format, the runtime environment first checks whether the SDOP_mh already exists. If not, then the runtime environment generates the SDOP_mh using the library method, as described above. If the SDOP_mh already exists, the runtime environment obtains the SDOP_mh from the heap memory.

8. OBTAINING AN ARGUMENT DISCOVERY METHOD HANDLE (AD_MH)

Figure 12:
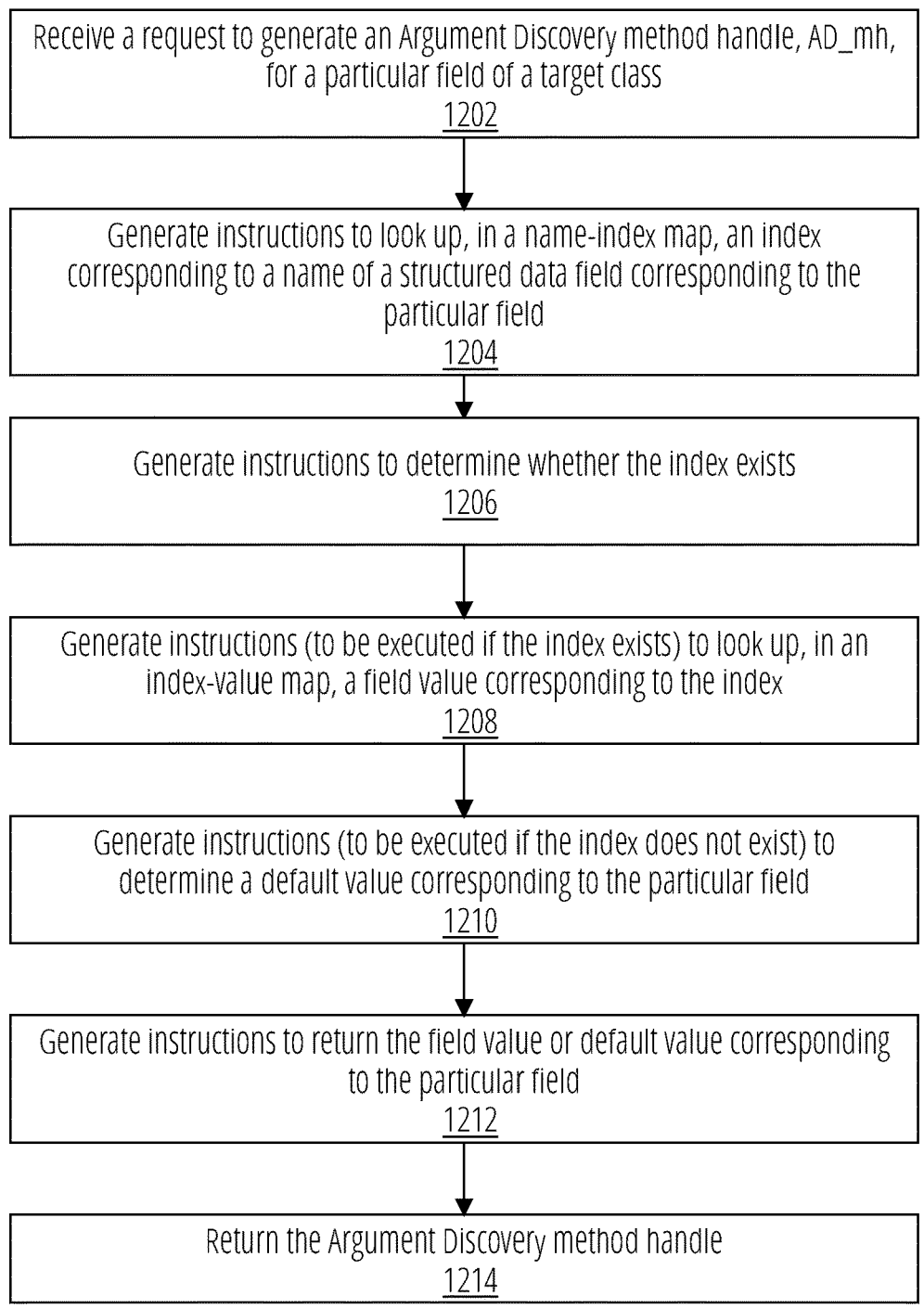
FIG. 12 illustrates an example set of operations for generating and returning an AD_mh in accordance with one embodiment.

FIG. 12 illustrates an example set of operations for generating and returning an AD_mh in accordance with one embodiment. One or more operations illustrated in FIG. 12 may be modified, rearranged, or omitted all together. Accordingly, the particular sequence of operations illustrated in FIG. 12 should not be construed as limiting the scope of one or more embodiments.

One or more embodiments include receiving a request to generate an Argument Discovery method handle, AD_mh, for a particular field of a target class (Operation 1202). A runtime environment receives a request to generate an Argument Discovery method handle, AD_mh, for a particular field of a target class.

In an embodiment, the following Operations 1204-1212 include generating instructions within a method referenced by the Argument Discovery method handle.

One or more embodiments include generating instructions to look up, in a name-index map, an index corresponding to a name of a structured data field corresponding to the particular field (Operation 1204). The runtime environment generates instructions to look up, in a name-index map, an index corresponding to a name of a structured data field corresponding to the particular field.

In an embodiment, the runtime environment may generate instructions to look up the structured data field corresponding to the particular field of the target class based on desired mappings between the structured data fields and the fields of the target class. The structured data field corresponding to the particular field of the target class is fed into the instructions to look up the index in the name-index map.

As an example, a target class may declare the following fields in the following sequence: int xcoord, int ycoord, int zcoord. A structured data object may include structured data fields of the same names in the same sequence. A name-index map may include the following mappings:

xcoord—0
ycoord—1
zcoord—2

Since the names and sequences of the target class fields and the structure data fields are the same, there may be an assumed mapping between the first structured data field and the first target class field, both named "xcoord." There may be an assumed mapping between the second structured data field and the second target class field, both named "ycoord." There may be an assumed mapping between the third structured data field and the third target class field, both named "zcoord." A runtime environment may receive a request to generate an AD_mh1 for the target class field "xcoord." Hence, the runtime environment may generate instructions for AD_mh1 to look up, in the name-index map, an index corresponding to the structured data field "xcoord." Subsequently, the runtime environment may receive a request to generate an AD_mh2 for the target class field "ycoord." Similarly, the runtime environment may generate instructions for AD_mh2 to look up, in the name-index map, an index corresponding to the structured data field "ycoord."

One or more embodiments include generating instructions to determine whether the index exists (Operation 1206). The runtime environment generates a conditional statement to evaluate whether the index exists. As discussed above with reference to FIG. 7, in an embodiment, a map pair does not include any entry for a structured data field where the value for the structured data field is the same as a default value for the corresponding field of the target class.

One or more embodiments include generating instructions (to be executed if the index exists) to look up, in an index-value map, a field value corresponding to the index (Operation 1208). The runtime environment generates instructions to look up, in an index-value map, a field value corresponding to the index. The instructions are executed if the conditional statement evaluates to true.

One or more embodiments include generating instructions (to be executed if the index does not exist) to determine a default value corresponding to the particular field (operation 1210). The runtime environment generates instructions to determine a default value corresponding to the particular field. The instructions may indicate that the default value is determined based on a type of the particular field.

In one or more embodiments (not illustrated), the runtime environment generates instructions to return an alternate value, that is neither a value looked up from an index-value map, nor a default value corresponding to the particular field. The instruction to return the alternate value may be conditioned on a particular criterion. The alternate value may be bounded to the code associated with the Argument Discovery method handle. The alternate value may be useful for testing purposes, for scrubbing sensitive information, and/or other purposes.

One or more embodiments include generating instructions to return the field value or default value corresponding to the particular field (Operation 1212). The runtime environment determines a return type for the Argument Discovery method handle by taking the static type of the particular field for which the Argument Discovery method handle is being generated. Furthermore, the runtime environment generates instructions to return the field value or default value corresponding to the particular field. In an embodiment, the value returned is of the determined return type. In another embodiment, the value returned is of a type that is assignable to the determined return type.

One or more embodiments include returning the Argument Discovery method handle (Operation 1214). The runtime environment returns the Argument Discovery method handle.

9. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
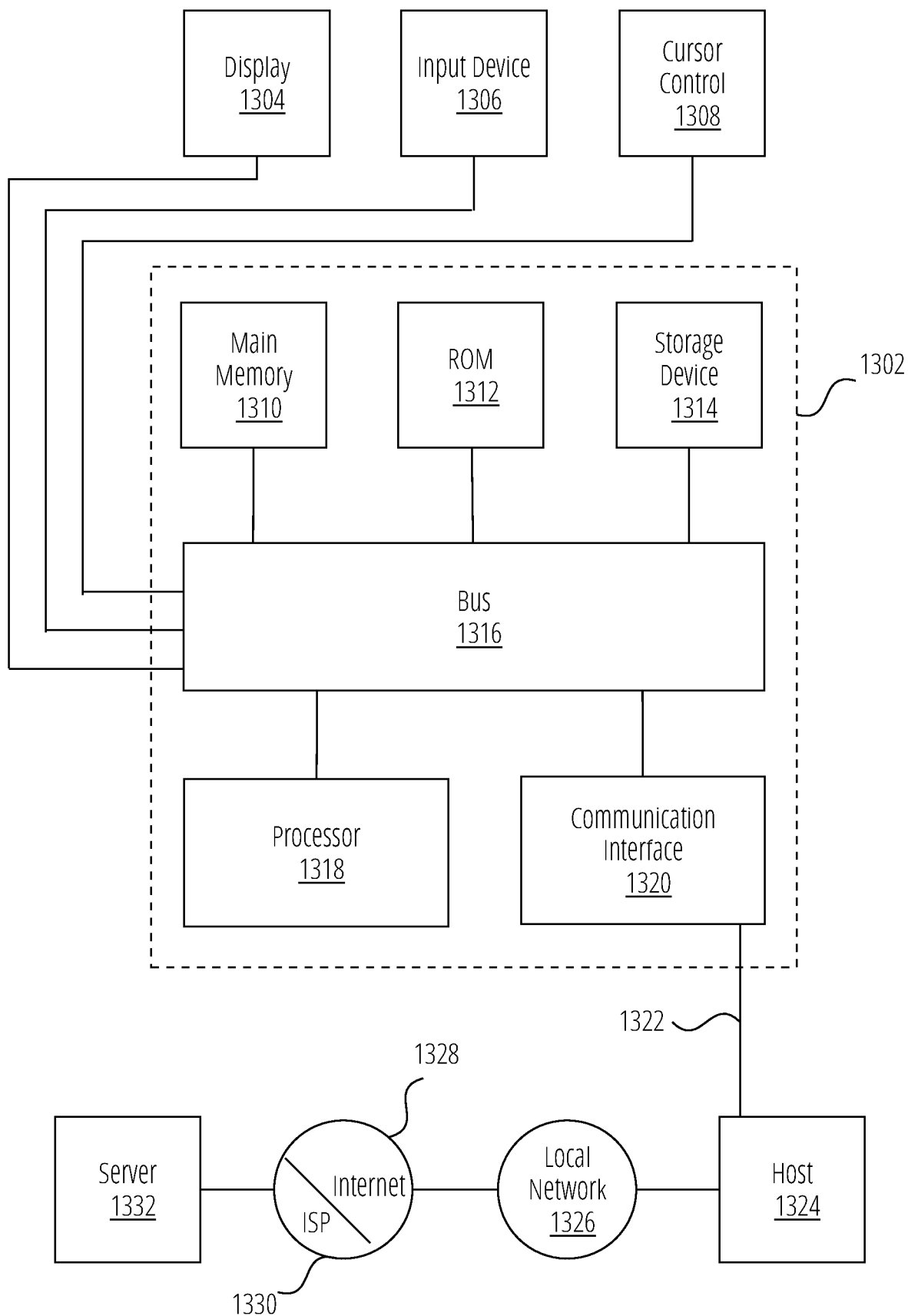
FIG. 13 is a block diagram illustrating a system in accordance with one embodiment.

For example, FIG. 13 is a block diagram that illustrates a computer system 1302 upon which an embodiment of the invention may be implemented. Computer system 1302 includes a bus 1316 or other communication mechanism for communicating information, and a hardware processor 1318 coupled with bus 1316 for processing information. Hardware processor 1318 may be, for example, a general purpose microprocessor.

Computer system 1302 also includes a main memory 1310, such as a random access memory (RAM) or other dynamic storage device, coupled to bus 1316 for storing information and instructions to be executed by processor 1318. Main memory 1310 also may be used for storing temporary variables or other intermediate information during execution of instructions to be executed by processor 1318. Such instructions, when stored in non-transitory storage media accessible to processor 1318, render computer system 1302 into a special-purpose machine that is customized to perform the operations specified in the instructions.

Computer system 1302 further includes a read only memory ROM 1312 or other static storage device coupled to bus 1316 for storing static information and instructions for processor 1318. A storage device 1314, such as a magnetic disk or optical disk, is provided and coupled to bus 1316 for storing information and instructions.

Computer system 1302 may be coupled via bus 1316 to a display 1304, such as a cathode ray tube (CRT), for displaying information to a computer user. An input device 1306, including alphanumeric and other keys, is coupled to bus 1316 for communicating information and command selections to processor 1318. Another type of user input device is cursor control 1308, such as a mouse, a trackball, or cursor direction keys for communicating direction information and command selections to processor 1318 and for controlling cursor movement on display 1304. This input device typically has two degrees of freedom in two axes, a first axis (e.g., x) and a second axis (e.g., y), that allows the device to specify positions in a plane.

Computer system 1302 may implement the techniques described herein using customized hard-wired logic, one or more ASICs or FPGAs, firmware and/or program logic which in combination with the computer system causes or programs computer system 1302 to be a special-purpose machine. According to one embodiment, the techniques herein are performed by computer system 1302 in response to processor 1318 executing one or more sequences of one or more instructions contained in main memory 1310. Such instructions may be read into main memory 1310 from another storage medium, such as storage device 1314. Execution of the sequences of instructions contained in main memory 1310 causes processor 1318 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1314. Volatile media includes dynamic memory, such as main memory 1310. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1316. Transmission media can also take the form of acoustic or light waves, such as those generated during radio-wave and infra-red data communications.

Various forms of media may be involved in carrying one or more sequences of one or more instructions to processor 1318 for execution. For example, the instructions may initially be carried on a magnetic disk or solid state drive of a remote computer. The remote computer can load the instructions into its dynamic memory and send the instructions over a telephone line using a modem. A modem local to computer system 1302 can receive the data on the telephone line and use an infra-red transmitter to convert the data to an infra-red signal. An infra-red detector can receive the data carried in the infra-red signal and appropriate circuitry can place the data on bus 1316. Bus 1316 carries the data to main memory 1310, from which processor 1318 retrieves and executes the instructions. The instructions received by main memory 1310 may optionally be stored on storage device 1314 either before or after execution by processor 1318.

Computer system 1302 also includes a communication interface 1320 coupled to bus 1316. Communication interface 1320 provides a two-way data communication coupling to a network link 1322 that is connected to a local network 1326. For example, communication interface 1320 may be an integrated services digital network (ISDN) card, cable modem, satellite modem, or a modem to provide a data communication connection to a corresponding type of telephone line. As another example, communication interface 1320 may be a local area network (LAN) card to provide a data communication connection to a compatible LAN. Wireless links may also be implemented. In any such implementation, communication interface 1320 sends and receives electrical, electromagnetic or optical signals that carry digital data streams representing various types of information.

Network link 1322 typically provides data communication through one or more networks to other data devices. For example, network link 1322 may provide a connection through local network 1326 to a host computer 1324 or to data equipment operated by an Internet Service Provider ISP 1330. ISP 1330 in turn provides data communication services through the world wide packet data communication network now commonly referred to as the Internet 1328. Local network 1326 and Internet 1328 both use electrical, electromagnetic or optical signals that carry digital data streams. The signals through the various networks and the signals on network link 1322 and through communication interface 1320, which carry the digital data to and from computer system 1302, are example forms of transmission media.

Computer system 1302 can send messages and receive data, including program code, through the network(s), network link 1322 and communication interface 1320. In the Internet example, a server 1332 might transmit a requested code for an application program through Internet 1328, ISP 1330, local network 1326 and communication interface 1320.

The received code may be executed by processor 1318 as it is received, and/or stored in storage device 1314, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction

What is claimed is:

1. One or more non-transitory computer readable media storing instructions which, when executed by one or more hardware processors, cause:
   receiving a request to create a target object based on a structured data object;
   identifying a name-index map and an index-value map from the structured data object, wherein the name-index map comprises a first set of mappings between names of a set of one or more structured data fields and a set of one or more indices, and the index-value map comprises a second set of mappings between the set of one or more indices and field values of the set of one or more structured data fields;
   obtaining a set of method handles for creating the target object;
   wherein a first method handle, of the set of method handles, is adapted, directly or indirectly, from a second method handle of the set of method handles that references a constructor of a target class;
   invoking the first method handle using the name-index map and the index-value map;
   creating the target object of the target class based on the structured data object.

2. The media of claim 1, wherein invoking the first method handle using the name-index map and the index-value map thereby invokes the constructor of the target class.

3. The media of claim 1, further storing instructions which cause:
   invoking an Argument Discovery method handle associated with a first field of the target class;
   inserting a return value from the Argument Discovery method handle into an argument position of the second method handle corresponding to the first field of the target class.

4. The media of claim 3, wherein a first field name of a structured data field, of the set of structured data fields, corresponding to the first field of the target class is bound as a constant into the Argument Discovery method handle.

5. The media of claim 3, further storing instructions which cause:
   based on the Argument Discovery method handle:
     looking up, in the name-index map, an index corresponding to a first field name of a structured data field, of the set of structured data fields, corresponding to the first field of the target class.

6. The media of claim 5, wherein the first field name of the structured data field is same as a second field name of the first field of the target class.

7. The media of claim 5, further storing instructions which cause:
   based on the Argument Discovery method handle:
   determining desired mappings between the structured data fields and a set of one or more fields of the target class;
   based on the desired mappings, determining that the structured data field, of the set of structured data fields, corresponds to the first field of the target class.

8. The media of claim 5, further storing instructions which cause:
   based on the Argument Discovery method handle:
     looking up, in the index-value map, a field value corresponding to the index;
     returning the field value as the return value.

9. The media of claim 5, further storing instructions which cause:
   based on the Argument Discovery method handle:
     determining that the index corresponding to the first field name of the structured data field corresponding to the first field of the target class does not exist in the name-index map;
     returning a default value as the return value.

10. The media of claim 3, wherein:
    the constructor of the target class is a canonical constructor; and
    the argument position of the second method handle corresponding to the first field of the target class is determined based on a position of the first field in a sequence of fields as declared in the target class.

11. The media of claim 1, further storing instructions comprising:
    accessing a runtime constant pool associated with the target class to obtain the first method handle.

12. The media of claim 1, further storing instructions comprising:
    identifying a first entry, within a runtime constant pool associated with the target class, corresponding to the first method handle;
    identifying a first bootstrap method based on the first entry;
    executing the first bootstrap method to generate the first method handle.

13. The media of claim 12, further storing instructions comprising:
    identifying a first set of one or more arguments to the first bootstrap method specified by the first entry, wherein the first set of one or more arguments comprises a first Argument Discovery method handle;
    identifying a second entry, within the runtime constant pool, corresponding to the first Argument Discovery method handle;
    identifying a second bootstrap method based on the second entry;
    executing the second bootstrap method to generate the first Argument Discovery method handle.

14. The media of claim 13, further storing instructions comprising:
    identifying a second set of one or more arguments to the second bootstrap method specified by the second entry, wherein the second set of one or more arguments comprises a constant representing a name of a structured data field of the set of structured data fields.

15. The media of claim 12, further storing instructions comprising:
identifying a first set of one or more arguments to the first bootstrap method specified by the first entry, wherein the first set of one or more arguments comprises a constant representing a name of a structured data field of the set of structured data fields.

16. The media of claim 1, further storing instructions comprising:
generating the second method handle;
adapting the second method handle to generate a third method handle, of the set of method handles;
adapting a fourth method handle, of the set of method handles, to generate the first method handle.

17. The media of claim 1, wherein the target class is determinable based on at least one of the request, the structured data object, and a header of the structured data object.

18. One or more non-transitory computer readable media storing instructions which, when executed by one or more hardware processors, cause:
receiving a request to create a target object based on a structured data object, wherein the structured data object does not explicitly denote a target class for the target object;
obtaining a set of method handles for creating the target object;
wherein a first method handle, of the set of method handles, is adapted, directly or indirectly, from a second method handle of the set of method handles that references a constructor of the target class;
invoking the first method handle using at least one of the structured data object and a representation of the structured data object;
creating the target object of the target class based on the structured data object.

19. The media of claim 18, wherein a header of the structured data object does not explicitly denote the target class for the target object.

20. The media of claim 18, wherein invoking the first method handle using the at least one of the structured data object and the representation of the structured data object thereby invokes the constructor of the target class.

21. The media of claim 18, further storing instructions which cause:
invoking an Argument Discovery method handle associated with a first field of the target class;
inserting a return value from the Argument Discovery method handle into an argument position of the second method handle corresponding to the first field of the target class.

22. The media of claim 21, wherein a first field name of a structured data field, of the set of structured data fields, corresponding to the first field of the target class is bound as a constant into the Argument Discovery method handle.

23. The media of claim 21, further storing instructions which cause:
based on the Argument Discovery method handle:
looking up, in the at least one of the structured data object and the representation of the structured data object, a field value corresponding to the first field of the target class;
returning the field value as the return value.

24. The media of claim 21, further storing instructions which cause:
based on the Argument Discovery method handle:
determining that any field value corresponding to the first field of the target class does not exist in the at least one of the structured data object and the representation of the structured data object;
returning a default value as the return value.

25. The media of claim 18, further storing instructions which cause:
responsive to invoking the first method handle:
determining that the first method handle is adapted from a third method handle, of the set of method handles;
determining that a fourth method handle, of the set of method handles, is adapted from a second method handle;
determining that the second method handle references the constructor associated with the target class.

26. The media of claim 18, wherein the first method handle is a runtime-computed constant in the runtime constant pool.

27. The media of claim 18, wherein a dynamic compiler performs at least one of inlining and constant folding for the first method handle and one or more of the set of method handles responsive to recognizing the first method handle as a constant that is optimizable.

28. The media of claim 18, wherein creating the target object comprises storing a data structure representing the target object into a heap memory.

29. The media of claim 18, wherein the target class is determinable based on at least one of an interface and an abstract class explicitly denoted by at least one of the structured data object and a header of the structured data object.

30. A method, comprising:
receiving a request to create a target object based on a structured data object;
identifying a name-index map and an index-value map from the structured data object, wherein the name-index map comprises a first set of mappings between names of a set of one or more structured data fields and a set of one or more indices, and the index-value map comprises a second set of mappings between the set of one or more indices and field values of the set of one or more structured data fields;
obtaining a set of method handles for creating the target object;
wherein a first method handle, of the set of method handles, is adapted, directly or indirectly, from a second method handle of the set of method handles that references a constructor of a target class;
invoking the first method handle using the name-index map and the index-value map;
creating the target object of the target class based on the structured data object;
wherein the method is performed by one or more devices, each including at least one hardware processor.

31. A system, comprising:
one or more devices, each including at least one hardware processor; and
the system being configured to perform operations comprising:
receiving a request to create a target object based on a structured data object;
identifying a name-index map and an index-value map from the structured data object, wherein the name-index map comprises a first set of mappings between names of a set of one or more structured data fields and a set of one or more indices, and the index-value map comprises a second set of mappings between the set of one or more indices and field values of the set of one or more structured data fields;

obtaining a set of method handles for creating the target object;

wherein a first method handle, of the set of method handles, is adapted, directly or indirectly, from a second method handle of the set of method handles that references a constructor of a target class;

invoking the first method handle using the name-index map and the index-value map;

creating the target object of the target class based on the structured data object.

32. A method comprising:

receiving a request to create a target object based on a structured data object, wherein the structured data object does not explicitly denote a target class for the target object;

obtaining a set of method handles for creating the target object;

wherein a first method handle, of the set of method handles, is adapted, directly or indirectly, from a second method handle of the set of method handles that references a constructor of the target class;

invoking the first method handle using at least one of the structured data object and a representation of the structured data object;

creating the target object of the target class based on the structured data object;

wherein the method is performed by one or more devices, each including at least one hardware processor.

33. A system, comprising:

one or more devices, each including at least one hardware processor; and the system being configured to perform operations comprising:

receiving a request to create a target object based on a structured data object, wherein the structured data object does not explicitly denote a target class for the target object;

obtaining a set of method handles for creating the target object;

wherein a first method handle, of the set of method handles, is adapted, directly or indirectly, from a second method handle of the set of method handles that references a constructor of the target class;

invoking the first method handle using at least one of the structured data object and a representation of the structured data object;

creating the target object of the target class based on the structured data object.

* * * * *

UNITED STATES PATENT AND TRADEMARK OFFICE
CERTIFICATE OF CORRECTION

PATENT NO. : 11,288,045 B1
APPLICATION NO. : 17/171327
DATED : March 29, 2022
INVENTOR(S) : Hegarty et al.

It is certified that error appears in the above-identified patent and that said Letters Patent is hereby corrected as shown below:

On the Title Page

On page 2, Column 1, Item (56) under Other Publications, Line 5, delete "©" and insert -- @ --, therefor.

On page 2, Column 1, Item (56) under Other Publications, Line 6, delete "dataed:" and insert -- dated: --, therefor.

On page 2, Column 1, Item (56) under Other Publications, Line 15, delete "avaolable" and insert -- available --, therefor.

On page 2, Column 1, Item (56) under Other Publications, Line 15, delete "openjdkjava" and insert -- openjdk.java --, therefor.

In the Drawings

On sheet 1 of 13, in FIG. 1, under Reference Numeral 104, Line 3, delete "104" and insert -- 107 --, therefor.

In the Specification

In Column 1, Line 48, delete "section" and insert -- section. --, therefor.

In Column 15, Line 20, delete "adaptation"" and insert -- adaptation --, therefor.

In Column 22, Line 61, delete ""turnedon"" and insert -- "turnedOn" --, therefor.

In Column 23, Line 52, delete "namea1" and insert -- namea0 --, therefor.

In Column 37, Line 25, delete "correction" and insert -- correction. --, therefor.

Signed and Sealed this
Sixteenth Day of August, 2022

*Katherine Kelly Vidal*

Katherine Kelly Vidal
*Director of the United States Patent and Trademark Office*